(12) United States Patent
Zalucki

(10) Patent No.: US 11,221,792 B1
(45) Date of Patent: Jan. 11, 2022

(54) STORAGE METHOD USING MEMORY CHAIN ADDRESSING

(71) Applicant: BAE Systems Information and Electronic Systems Integration Inc., Nashua, NH (US)

(72) Inventor: Michael A. Zalucki, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/069,757

(22) Filed: Oct. 13, 2020

(51) Int. Cl.
*G06F 3/06* (2006.01)
(52) U.S. Cl.
CPC .......... *G06F 3/0655* (2013.01); *G06F 3/0604* (2013.01); *G06F 3/0652* (2013.01); *G06F 3/0676* (2013.01); *G06F 3/0679* (2013.01)
(58) Field of Classification Search
CPC .... G06F 3/0604; G06F 3/0652; G06F 3/0679; G06F 3/0655
USPC ........................................................ 711/154
See application file for complete search history.

(56) References Cited

U.S. PATENT DOCUMENTS

| | | | | |
|---|---|---|---|---|
| 4,754,427 A | * | 6/1988 | Okayama | G05B 19/052 700/3 |
| 2010/0070688 A1 | * | 3/2010 | Lin | G06F 12/0246 711/103 |
| 2021/0271600 A1 | * | 9/2021 | Choi | G06F 12/0284 |

* cited by examiner

*Primary Examiner* — Hashem Farrokh
(74) *Attorney, Agent, or Firm* — Finch & Maloney PLLC

(57) ABSTRACT

A storage system is configured to facilitate memory operations with the memory that avoid the need for defragmentation. The system includes one or more memory devices and a memory interface operatively coupled with the one or more memory devices. The memory interface includes a start page module that provides a start page table having a page number that includes a first part of a corresponding dataset. A link page module of the memory interface provides a link page table that indicates an address for a current page of a given dataset and an address for a next page of the given dataset. Write/read page modules of the memory interface provide write/read page tables that include sub-addresses of a page where a portion of a corresponding dataset is being written/read. The memory interface executes data read, write, and erase operations that are tracked using the tables provided by the various modules.

20 Claims, 15 Drawing Sheets

STORAGE METHOD USING MEMORY CHAIN ADDRESSING

GOVERNMENT LICENSE RIGHTS

This invention was made with United States Government assistance. The United States Government has certain rights in this invention.

BACKGROUND

Computer architectures commonly utilize dynamically assigned memory. Memory controllers typically allocate dynamic memory resources sequentially as more and more data is written to memory. This can cause a problem when it comes time to unallocate and reuse memory. If memory resources located in the middle of a region are unallocated, then the memory becomes fragmented because it is non-contiguous. This memory becomes hard to reuse as further written data may not fit perfectly within the gap. In some cases, the memory controller is forced to split up data from future writes or ignore the gap region until defragmentation can be performed. Defragmentation can take a relatively long time because large regions of memory may need to be copied. Due to this, it is generally desirable to not perform defragmentation very often or avoid it entirely. Accordingly, there are many non-trivial issues with regards to providing efficient data storage.

BRIEF DESCRIPTION OF THE DRAWINGS

Features and advantages of embodiments of the claimed subject matter will become apparent as the following Detailed Description proceeds, and upon reference to the Drawings, in which:

Figure 1:
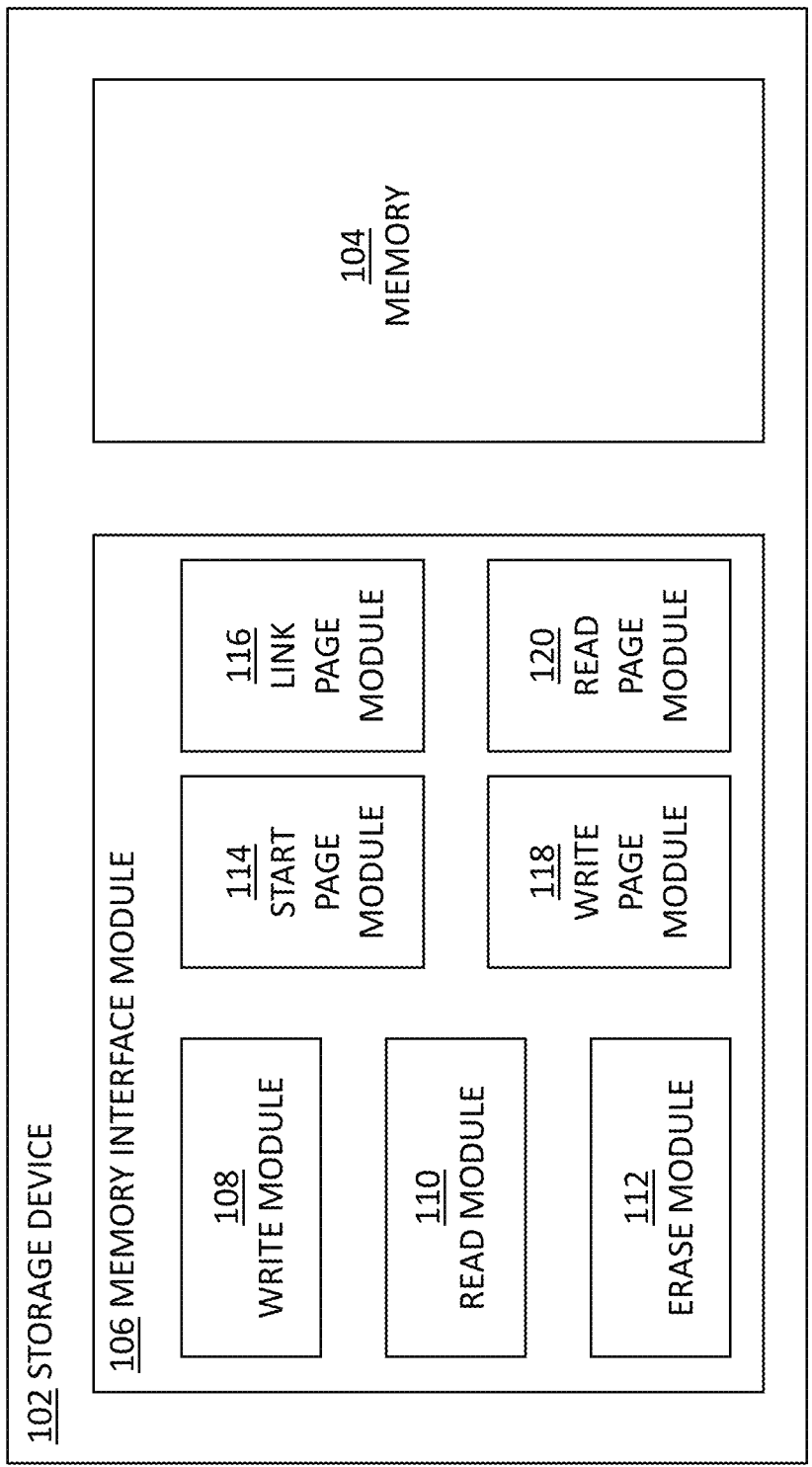
FIG. 1 illustrates a block diagram of a storage device, configured in accordance with an embodiment of the present disclosure.

Although the following Detailed Description will proceed with reference being made to illustrative embodiments, many alternatives, modifications, and variations thereof will be apparent in light of this disclosure.

DETAILED DESCRIPTION

A storage device is disclosed. The storage device can include any type of memory such as volatile or non-volatile memory. Furthermore, the memory may be physical or virtual memory. According to an embodiment, the storage device includes one or more processors or integrated circuits programmed or otherwise configured to facilitate memory operations with the memory that avoid the need for defragmentation. That is, memory is allocated using a chain addressing technique that keeps track of linked pages of memory at all times regardless of the physical memory locations of the data. The storage device is particularly well-suited for embedded systems, but other applications having limited memory capacity will be apparent as well. In an embodiment, a storage device includes one or more memory devices and a memory interface operatively coupled with the one or more memory devices. The memory interface can be implemented, for example, as an integrated circuit or a programmed processor. Data is organized across a plurality of memory pages having a predetermined size. In some such embodiments, the memory interface includes various modules that provide and update data structures to track where and when data is written, read, and/or erased from the memory. For example, a start page module provides a start page table having a page number that includes a first part of a corresponding dataset. In addition, a link page module provides a link page table that indicates an address for a current page of a given dataset and an address for a next page of the given dataset. In addition, a current write page module provides a current write page table that includes first sub-address of a current page where a portion of a corresponding dataset is being written. In addition, a current read page module provides a current read page table that includes a second sub-address of a current page where a portion of a corresponding dataset is being read. As will be appreciated, the modules referred to herein are used to facilitate explanation and understanding of the disclosed methodologies, and are not intended to implicate any rigid structure or limitation. Rather, the functionality of the various modules may be integrated into any number of modules (multiple modules or a single module) and the level of integration can vary from one embodiment of the next. The memory interface may be designed to execute data read, write, and erase operations that are tracked using the tables provided by the various modules. Numerous embodiments and variations will be appreciated in light of this disclosure.

General Overview

Efficient memory storage is always desirable in nearly every storage system. However, and as previously explained, memory fragmentation is a non-trivial problem, particularly when using dynamically allocated memory. Fragmentation refers to a common condition in computing systems wherein long contiguous regions in a given memory become fragmented into smaller and smaller contiguous areas as memory usage continues over time. These fragments oftentimes become unused chunks of memory addresses, particularly when they get small enough, because there is a limited amount of data that fits within that space. As noted above, a defragmentation process can be used to reduce fragmentation and make a given memory more efficient, but such a process is time consuming and may not be possible for systems that require constant access to their memory. Another possible solution to the fragmentation problem involves pre-allocating all of the memory to be used, which generally leads to very high memory usage and is often not practical for smaller embedded systems.

Thus, dynamic memory storage techniques are provided herein that employ chain addressing to eliminate or otherwise reduce memory fragmentation. The techniques use a memory paging system and several data tables. The memory paging system divides the memory into pages of some predetermined size. Smaller sized pages are more efficient regarding physical memory usage, while larger sized pages means that smaller tables can be used. In some embodiments, the tables include a start page table, a link page table, and current page and current sub-address tables, each of which will be explained in turn. The start page table contains the page number where the first part of the dataset is stored. The address for this table is a unique identifier that is tied to the dataset. This can be a virtual address or simply a random number. There is also a valid field that defines whether or not each entry is valid. This can be either included in this table or in a parallel table. The link page table contains the page number of the next portion of data. The current page is used as the address for the link page table. There is also a valid field that defines whether or not each entry is valid. This can be either included in this table or in a parallel table. If an entry is not valid then there are no more pages linked to a dataset. The current page and current sub-address tables respectively contain the current page and sub-address (address within the page) for pipelined write operations that are longer than 1 word. There are also identical tables for pipelined read operations. These tables have a depth greater than or equal to the pipelining and will automatically configure themselves based on the application.

As will be appreciated, the techniques support common memory interface commands, including write, read, and erase commands. In some embodiments, new pages of memory are allocated as needed during writes, and pages are fetched from a first-in-first-out (FIFO) repository that contains all available memory pages. This FIFO is filled up on initialization and whenever a page is freed up during an erase command. Writes can be performed until there are no longer any pages available and the current page is full (the memory is full at this point and an error indicator is set). Read operations will read all of the data words contained in a dataset until the last word is reached, according to some such embodiments. The last word in a dataset is the current write page and current write sub-address (address within that page). Each word is read each time the read operation is performed. Some such embodiments provide an input that allows a user to declare a read for a new dataset, which will reset the read operation back to the beginning (start page for the dataset with a sub-address of zero). Read operations are sequential by default. Non-sequential reads can be performed, but they may cause more latency. Erase operations invalidate all of the entries associated with a dataset in the start page and link page tables. In some such embodiments, such erase operations are accomplished by first fetching the start page and then cycling through all link entries until the last entry is reached. As each page is freed up, it is added to the FIFO repository to be recycled.

As will be further appreciated, the chain addressing techniques provided herein are ideal for large datasets that are to be written and read in their entirety. Random access can still be performed, but it may come with a higher latency that depends on how deep in the chain the data is stored, particularly because every random access read or write must always start at the beginning of the chain and then read through all memory links from the link page table until the desired location is reached. Larger page size can make this process more efficient at the cost of reduced memory usage efficiency. Note that sequential reads and writes do not suffer from this additional latency. To this end, the techniques provided herein are particularly well-suited for applications that have lots of sequential reads and writes and few or no random access ones, but such is not intended to limit the present disclosure. In any case, one advantage of the techniques provided herein is that memory fragmentation is eliminated or otherwise reduced, by design, which greatly reduces the overhead involved in dynamically assigned memory management. The chain addressing techniques provide a unique approach to accomplish this, as such chain addressing is a relatively low overhead solution that keeps track of all memory locations that are part of a dataset regardless of their physical memory locations. By using an address chain instead of a simple lookup table, one can easily support any size dataset without having to predetermine size in advance. To this end, note that the chain addressing techniques provided herein scale up automatically in size based on how large each dataset is.

According to one example embodiment of the present disclosure, a storage system is disclosed that allocates memory for datasets within one or more linked memory pages having a predetermined size. Various table structures are created and continuously updated to track what pages contain what datasets. Memory pages having a large predetermined size require simpler table structures to track the datasets but may yield larger portions of unused memory while smaller memory pages make more efficient use of the storage space, but require more complex table structures to track the datasets. As used herein, the term "dataset" refers to a grouping of any amount of related data being written, read, or erased from the memory. A dataset may contain any number of data words (e.g., 8, 16, 32, or 64 bits, or some other established word size based on factors such as processor architecture). In one example, a single file may be stored as a single dataset.

In one specific such embodiment, the storage device is designed to dynamically allocate memory for one or more datasets. The storage device includes one or more memory devices having a plurality of pages with a predetermined size, and memory interface operatively coupled with the one or more memory devices. The memory interface includes a start page module designed to provide a start page table having a page number that includes a first part of a corresponding dataset of the one or more datasets. The memory interface further includes a link page module designed to provide a link page table that indicates an address for a current page of a given dataset and an address for a next page of the given dataset of the one or more datasets. The link page module also provides the address for the next page in response to receiving an address for an associated current page. The memory interface further includes a write page module designed to provide a first write page table that includes a first sub-address of a first page where a portion of a corresponding dataset is being written, and a read page module designed to provide a read page table that includes a second sub-address of a second page where a portion of a corresponding dataset is being read. Methods of performing read, write, and erase operations using one or more of the table structures are also disclosed and will be discussed in turn.

Note that, as used herein, the term "module" is intended to refer to a functional unit comprising hardware (e.g., gate-level logic) or hardware and software (e.g., a programmed processor). If a module is referred to as a software module, then it will be used in conjunction with one or more processors. For instance, a software module includes instructions encoded on one or more non-transitory machine-readable mediums (e.g., any physical memory) that when executed by one or more processors cause the functionality of that software module to be carried out.

Storage Device Overview

FIG. 1 illustrates an example storage device 102, according to an embodiment. Storage device 102 may be used within any electronic system to store data and/or manage storage of data. Storage device generally includes a memory 104 and a memory interface 106. Storage device 102 may be packaged in a single-chip package or a multi-chip package such as a system-on-chip (SoC), although any level of integration can be used, as will be appreciated.

Memory 104 may represent any type of dynamically addressable memory, including physical or virtual memory. Memory 104 can include one or more memory devices such as volatile memory (e.g., dynamic random-access memory (DRAM)), nonvolatile memory (e.g., read-only memory (ROM)), flash memory, solid state memory, and/or a hard drive. In some embodiments, memory 104 may include memory that shares a die with memory interface 106. In some embodiments, memory 104 includes embedded dynamic random-access memory (eDRAM), although any type of memory can be used, as will be appreciated.

According to an embodiment, memory 104 includes data storage that is organized in pages. Each page contains a predetermined size and is each addressable. The size of each page may be adjusted based on the particular application and the amount of data that is expected to be stored in memory 104. For example, in applications where a low amount of data is to be stored on memory 104, the pages may be set to each have a relatively small size while applications using larger amounts of data may use pages having relatively large sizes. Smaller pages have the benefit of more efficient memory usage as there is less "dead space" on a given page if it is not full with data. However, smaller pages produce more pages to track, which requires larger tables to identify which pages contain what data. Larger pages have the benefit of reducing the complexity of tracking which pages belong to what data but can be less efficient due to more dead space for any page that is not full of data.

In some embodiments, memory interface 106 represents one or more integrated circuits (ICs) configured to carry out the functionalities provided herein. For instance, memory interface 106 may be constructed with gate-level logic, such as a field programmable gate array (FPGA) or an application specific integrated circuit (ASIC). In such cases, memory interface 106 may include any hardware definable using a hardware programming language such as Very High-Speed Integrated Circuit Hardware Description Language (VHDL) or Verilog. Memory interface 106 may be fabricated on a single die or split across multiple dies. In other embodiments, memory interface 106 is implemented with one or more processors programmed or otherwise configured to carry out the functionalities provided herein. In a more general sense, memory interface 106 may be implemented with functional hardware or a functional combination of hardware and software. According to some embodiments, memory interface 106 represents a portion of a memory controller that facilitates data write, read, and erase operations with memory 104.

According to some embodiments, memory interface 106 includes one or more modules that control data access to and from memory 104. For example, memory interface 106 includes a write module 108 that is designed to receive data write requests from an application or from hardware, and to write the data to available space within memory 104. Accordingly, write module 108 may activate various address lines, strobe lines, and/or chip select lines to write the data into addressable pages of memory 104.

When receiving a dataset to be written to memory 104, the actions of write module 108 may be influenced by various other modules that track where and what pages to use for writing the dataset in order to avoid fragmenting the memory storage, according to an embodiment. A start page module 114 may be designed to provide a start page table that provides a list of memory pages where the beginning portions of datasets are stored. When a new dataset is to be written, the start page table may be updated to track what memory page represents the first page of the newly stored dataset. If the dataset is larger than what can be stored on a single memory page, then it is written across additional memory pages (as many as are needed to store the entire dataset). According to an embodiment, a link page module 116 may be used to provide a link page table that tracks which pages link to which other pages for datasets that span more than one page. Furthermore, a write page module 118 can be used to provide a write page table that tracks which page a write process is occurring on, and where on the given page (e.g., sub-address) the write is occurring. This is useful for pipelining multiple data read and/or write operations so that multiple datasets can be read and/or written simultaneously by interleaving data words from different datasets. In some embodiments, write page module 118 provides a first table for the page addresses of one or more datasets and a second table for tracking the page sub-addresses of the one or more datasets, the page address and sub-address tracking where writes are occurring or have occurred.

According to an embodiment, memory interface 106 includes a read module 110 that is designed to receive data read requests from an application or from hardware, and to read the requested dataset from memory 104. Accordingly, read module 110 may activate various address lines, strobe lines, and/or chip select lines to read the data from addressable pages of memory 104.

When receiving a request for a particular dataset from memory 104, the actions of read module 108 may be influenced by various other modules that track where the dataset is stored, according to an embodiment. As noted above, start page module 114 provides a start page table that has a list of memory pages where the beginning portions of datasets are stored. Accordingly, when a dataset is requested to be read, the start page table is accessed to identify which memory page has the beginning of the requested dataset. As the dataset is being read, it may extend beyond a single page. If this occurs, read module 110 may access the link page table provided by link page module 116 to determine the address of the next page that includes the continuing portion of the dataset. A dataset could be stored across any number of pages, and the link page table will identify which page links to which other page to form the address chain for the dataset. Furthermore, a read page module 120 can be used to provide a read page table that tracks which page a read process is occurring on, and where on the given page (e.g., sub-address) the read is occurring. This is useful for pipelining multiple data read and/or write operations so that data reads can be interrupted by one or more other processes and the read operation can then pick up where it left off on the correct memory page. In some embodiments, read page module 120 provides a first table for the page addresses of one or more datasets and a second table for tracking the page sub-addresses of the one or more datasets, the page address and sub-address tracking where reads are occurring or have occurred.

Simultaneous write/read is supported, according to some embodiments. For instance, in one such case, simultaneous write/read operations are allowed with the stipulation that if the write and read are on the same dataset then the read data rate must be slower or equal to the write data rate plus some constant latency. Complying with this condition enable the read operation to avoid reaching a false endpoint when the read page and sub-address becomes equal to the write page and sub-address. Protections can be implemented in higher level code to prevent this from happening. As will be appreciated, the user should not try to read something that has not yet been written (an error can be returned if this occurs).

According to an embodiment, memory interface 106 includes an erase module 112 that is designed to receive data erase requests from an application or from hardware, and to effectively erase the requested dataset from memory 104. According to an embodiment, the erase procedure performed by erase module 112 does not actually remove the dataset from memory 104, but rather frees up the one or more memory pages that the dataset is stored across so that the one or more memory pages can be used for future data write requests. When receiving a request to erase a dataset, erase module 112 is configured to access the start page table provided by start page module 114 and invalidate the start page associated with the dataset to be erased. This effectively frees the start page to be used again for future data write requests. Additionally, erase module 112 is configured to access the link page table provided by link page module 116 and invalidate any address links that had been created for the dataset. According to some embodiments, these acts of invalidating particular memory pages adds the memory pages for the erased dataset to a first-in first-out (FIFO) page repository that is accessed when new pages are needed for future data write requests.

According to some embodiments, one or more of start page module 114, link page module 116, write page module 118, and read page module 120 is stored on memory 104. In some embodiments, one or more of start page module 114, link page module 116, write page module 118, and read page module 120 is stored in a separate memory from memory 104.

Figure 2:
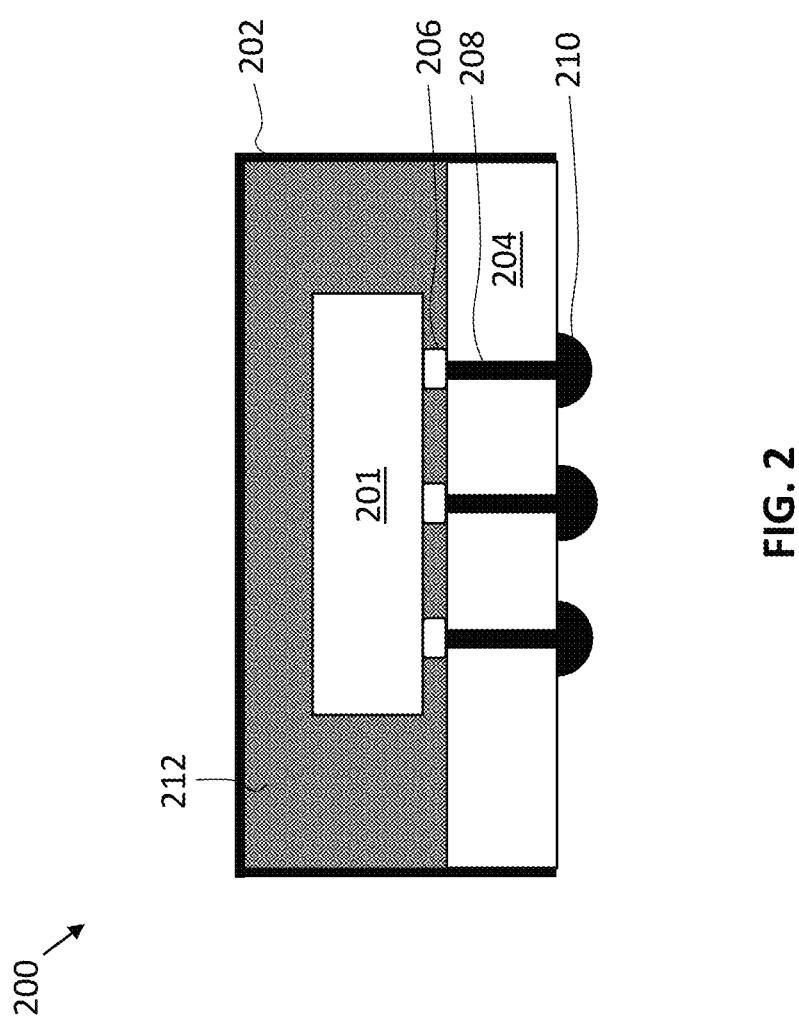
FIG. 2 illustrates a cross-section view of a chip package that includes the storage device of FIG. 1, in accordance with an embodiment of the present disclosure.

FIG. 2 illustrates an example embodiment of a chip package 200. As can be seen, chip package 200 may be a SIP that includes an integrated circuit (IC) die 201. Other dies may be included as well within chip package 200 and coupled to the same package substrate 204. In some embodiments, IC die 201 includes at least memory interface 106. In some embodiments, IC die 201 includes both memory interface 106 and memory 104. As can be further seen, chip package 200 includes a housing 202 that is bonded to package substrate 204. Housing 202 may be any material that provides environmental protection for the components of chip package 200. IC die 201 may be conductively coupled to package substrate 204 using connections 206. In some embodiments, connections 206 represent any standard or proprietary connection mechanism, such as solder bumps, ball grid array (BGA), pins, or wire bonds, to name a few examples. Package substrate 204 may include a dielectric material having conductive pathways (e.g., including conductive vias and lines) extending through the dielectric material between the faces of package substrate 204, or between different locations on each face. For example, package substrate 204 may include multiple stacked layers of dielectric material with conductive traces running surfaces of one or more of the layers of dielectric material, and one or more conductive vias extending between any number of the layers of dielectric material. In some embodiments, package substrate 204 may have a thickness less than 1 millimeter (e.g., between 0.1 millimeters and 0.5 millimeters), although any number of package geometries can be used. Additional conductive contacts 210 may be disposed at an opposite face of package substrate 204 for conductively contacting, for instance, a printed circuit board or another chip package. One or more vias 208 extend through a thickness of package substrate 204 to provide conductive pathways between one or more of connections 206 to one or more of contacts 210. Vias 208 may be single straight columns (as illustrated), however, other configurations can be used (e.g., damascene, dual damascene, through-silicon via). In still other embodiments, vias 208 are fabricated by multiple smaller stacked vias, or are staggered at different locations across various ones of the stacked dielectric layers of package substrate 204. Contacts 210 may be solder balls (e.g., for bump-based connections or a ball grid array arrangement), but any suitable package bonding mechanism may be used (e.g., pins in a pin grid array arrangement or lands in a land grid array arrangement). In some embodiments, a solder resist is disposed between contacts 210, to inhibit shorting.

In some embodiments, a mold material 212 may be disposed around IC die 201 included within housing 202. In some embodiments, mold material 212 is included between IC die 201 and package substrate 204 as an underfill material, as well as between IC die 201 and housing 202 as an overfill material. The dimensions and qualities of mold material 212 can vary depending on the type of chip package used and the environment the package is used in. In some embodiments, a thickness of mold material 212 is less than 1 millimeter. Example materials that may be used for mold material 212 include epoxy mold materials. In some cases, mold material 212 is thermally conductive, in addition to being electrically insulating.

Memory Operation Examples

Figure 3:
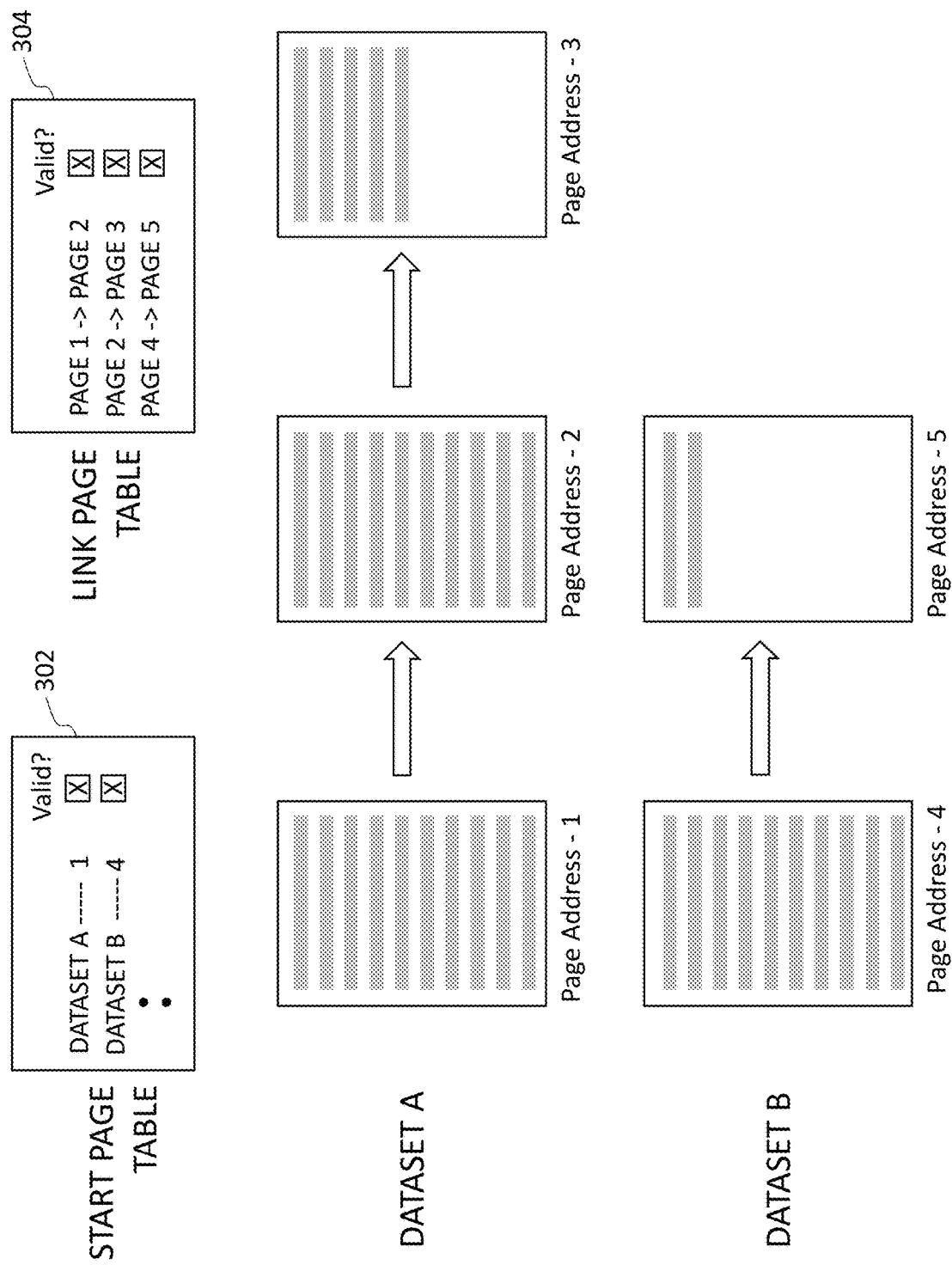
FIG. 3 graphically illustrates a data storage process flow across various linked memory pages, in accordance with an embodiment of the present disclosure.

FIG. 3 illustrates an example data storage situation where two datasets (A and B) are stored across multiple memory pages with the data storage tracked using a start page table 302 and a link page table 304, according to an embodiment. Although only two datasets are illustrated in this example, any number of datasets can be stored across any number of memory pages, with the datasets being tracked using start page table 302 and link page table 304.

Dataset A is stored across three memory pages. In this example, the data of dataset A fills the first two memory pages and a portion of the third memory page. The addresses of the pages have been provided arbitrary identifiers (1, 2, and 3), however, the addresses of the linked memory pages do not need to be in any particular order. In this example, a memory page having an address '1' is the first page of dataset A as indicated in start page table 302. A valid bit or flag is marked as being valid for the entry in start page table 302 associated with dataset A to indicate that this dataset is active (e.g., has not been erased). In some embodiments, the indicators of whether or not the datasets are valid are stored in a separate table from start page table 302.

Since Dataset A is written across more than one memory page, link page table 304 tracks which pages link together, according to an embodiment. In the illustrated example, one or more entries of link page table 304 indicate that page 1 links to page 2 and that page 2 links to page 3. As seen in link page table 304, page 3 does not link to any other page because it is the last page of its associated dataset. When looking for the address of the next page in a given dataset, link page table 304 is accessed using the address of the current page to find the entry that indicates what page is linked with the current page. Similar to start page table 302, a valid bit or flag is marked as being valid for the entries in links page table 304 associated with dataset A to indicate that this dataset is active (e.g., has not been erased). In some embodiments, the indicators of whether or not the datasets are valid are stored in a separate table from link page table 304.

Another dataset B is stored across two memory pages. In this example, the data of dataset B fills the first memory page and a portion of the second memory page. A memory page having an address '4' is the first page of dataset B as indicated in start page table 302. Furthermore, one or more entries of link page table 304 indicate that page 4 links to page 5. As seen in link page table 304, page 5 does not link to any other page because it is the last page of its associated dataset.

Figure 4A:
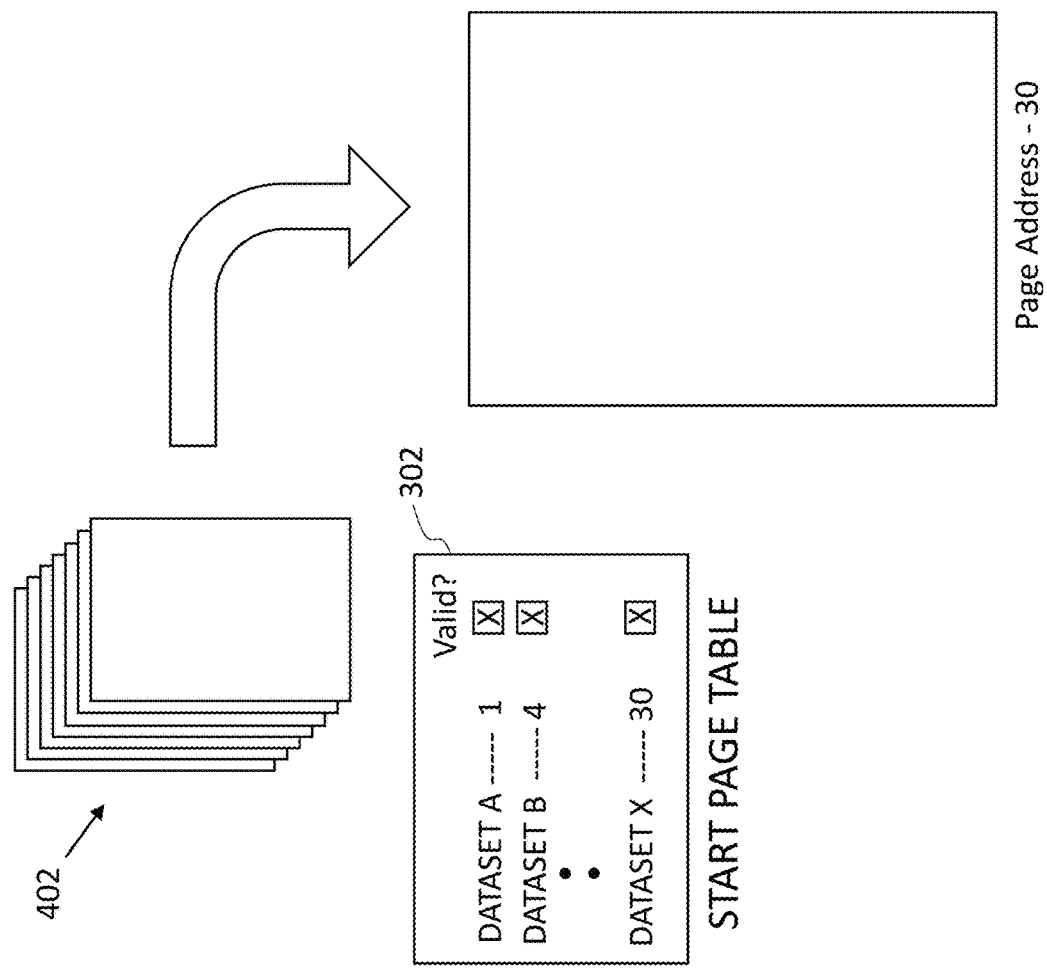
FIGS. 4A-4C graphically illustrate a write process flow using linked memory pages, in accordance with an embodiment of the present disclosure.
Figure 4B:
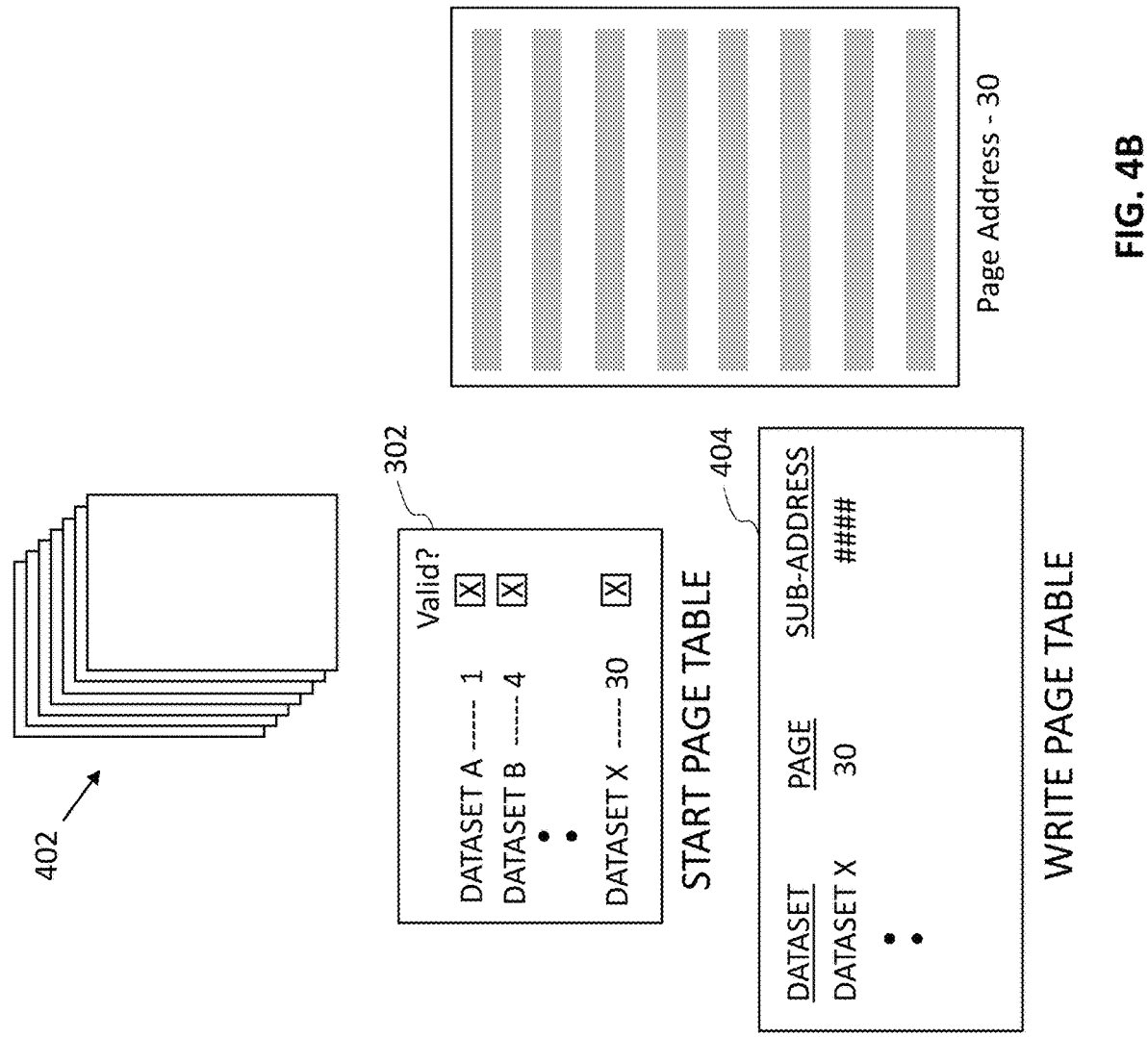
Figure 4C:
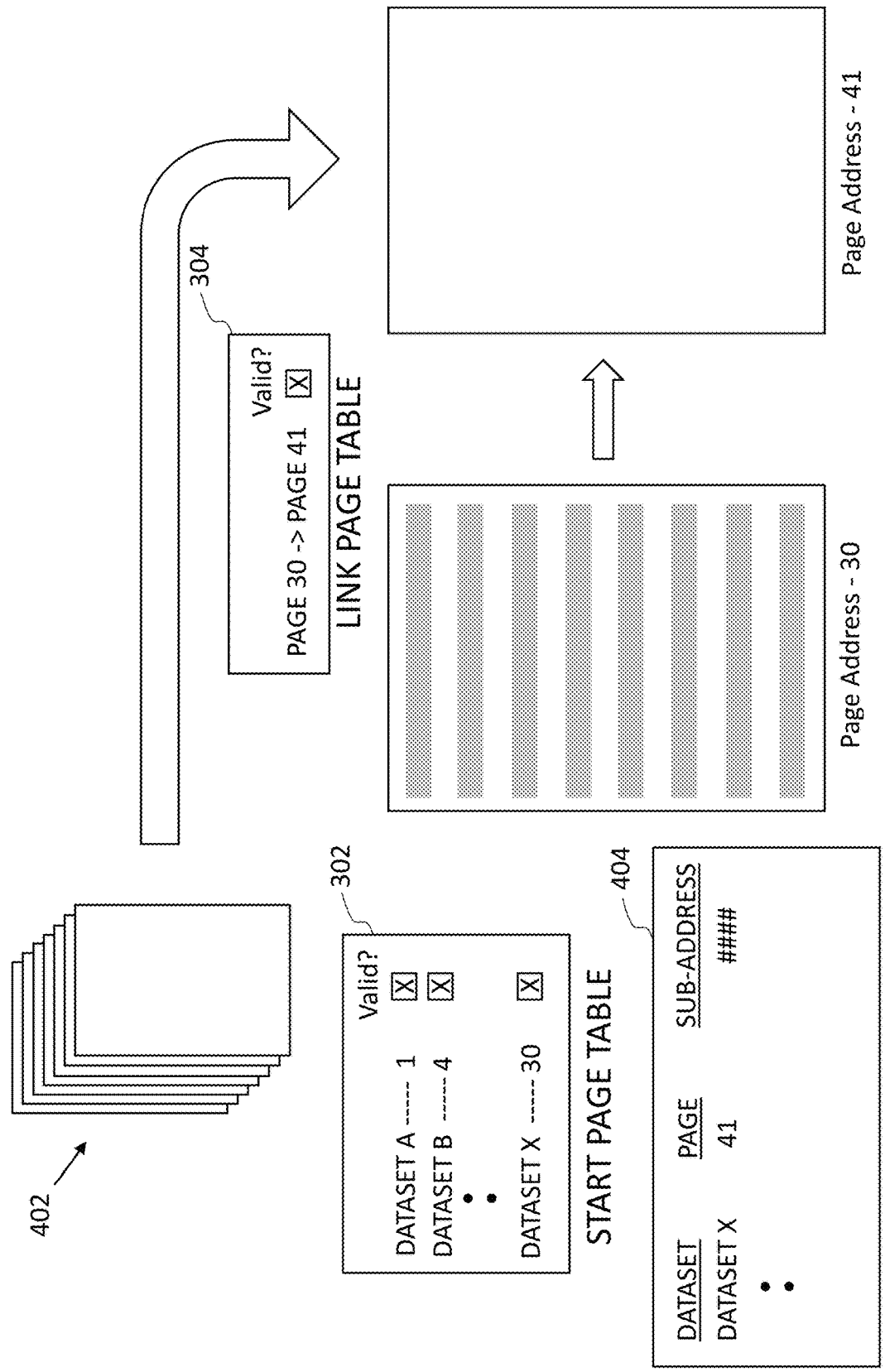

FIGS. 4A-4C illustrate a write operation for a new example dataset X, according to an embodiment. FIG. 4A illustrates the initialization of the write operation that involves fetching a first page for writing the data. According to an embodiment, the first page is fetched from a page repository 402 that includes a plurality of available pages within memory 104. In one example, page repository 402 operates like a FIFO data stack such that pages most recently freed up for further use are the last ones to be reused. The various pages within page repository 402 can be found in any portion of memory 104 and do not need to be maintained in any particular order based on the page address. In some examples, page repository 402 includes all available pages within memory 104.

In the illustrated example, a request to write a new dataset X resulted in a new page having page address 30 being retrieved from page repository 402. Accordingly, start page table 302 is updated with an entry to indicate that dataset X begins at page 30. This entry is also flagged as valid since dataset X is currently being written. Note that start page table 302 can include any number of entries to identify the start pages of any number of stored datasets.

FIG. 4B illustrates a continuation of the write operation where one or more data words of the dataset are written to the first page assigned to the dataset, according to an embodiment. The written data words are represented by the grey bars across the page. As the data words are being written on page 30, a write page table 404 is used to track where the writes are occurring. According to an embodiment, write page table 404 includes one or more entries used to track the page address and the page sub-address where data is written to for one or more datasets. The sub-address is continually updated as the write progresses across a given page and the page address is updated when a new page is added to the dataset.

According to an embodiment, the sub-addresses may be used to identify an address location within a single page. As such, when the write operation fills a memory page with data, the associated sub-address field in write page table 404 may be cleared to begin tracking writes again on the new page. In the illustrated example, when data has filled page 30, the sub-address field associated with dataset X in write page table 404 may revert back to identify the sub-address at the beginning of a page to prepare for writing the data on a next linked page.

FIG. 4C illustrates a continuation of the write operation where another page has been linked with the dataset since it was too large to fit on a single page, according to an embodiment. Once page 30 has been filled, and more data words from the dataset are still to be written, another page is retrieved from page repository 402 and linked with page 30. In the illustrated example, a page having page address 41 is retrieved from page repository 402 and link page table 304 is updated with an entry to indicate that page 30 links to page 41. This entry is also indicated as being valid. Once the new page is linked, the dataset can continue to be written on the newly linked page. As data is written to the new page 41, the page address field for dataset X in write page table 404 updates to reflect that writes are now occurring on page 41 and the sub-address field associated with dataset X is initially cleared (e.g., identifies the first sub-address of a given page) and is updated as data writes continue on page 41. According to an embodiment, once dataset X has been fully written across however many pages it takes up, the entry for dataset X in write page table 404 will identify the page address and page sub-address that indicates the end of the dataset.

Since write operations select one or more whole available pages for storing the data and the physical addresses of the pages are irrelevant, fragmentation of the memory is drastically reduced or eliminated all-together.

Figure 5A:
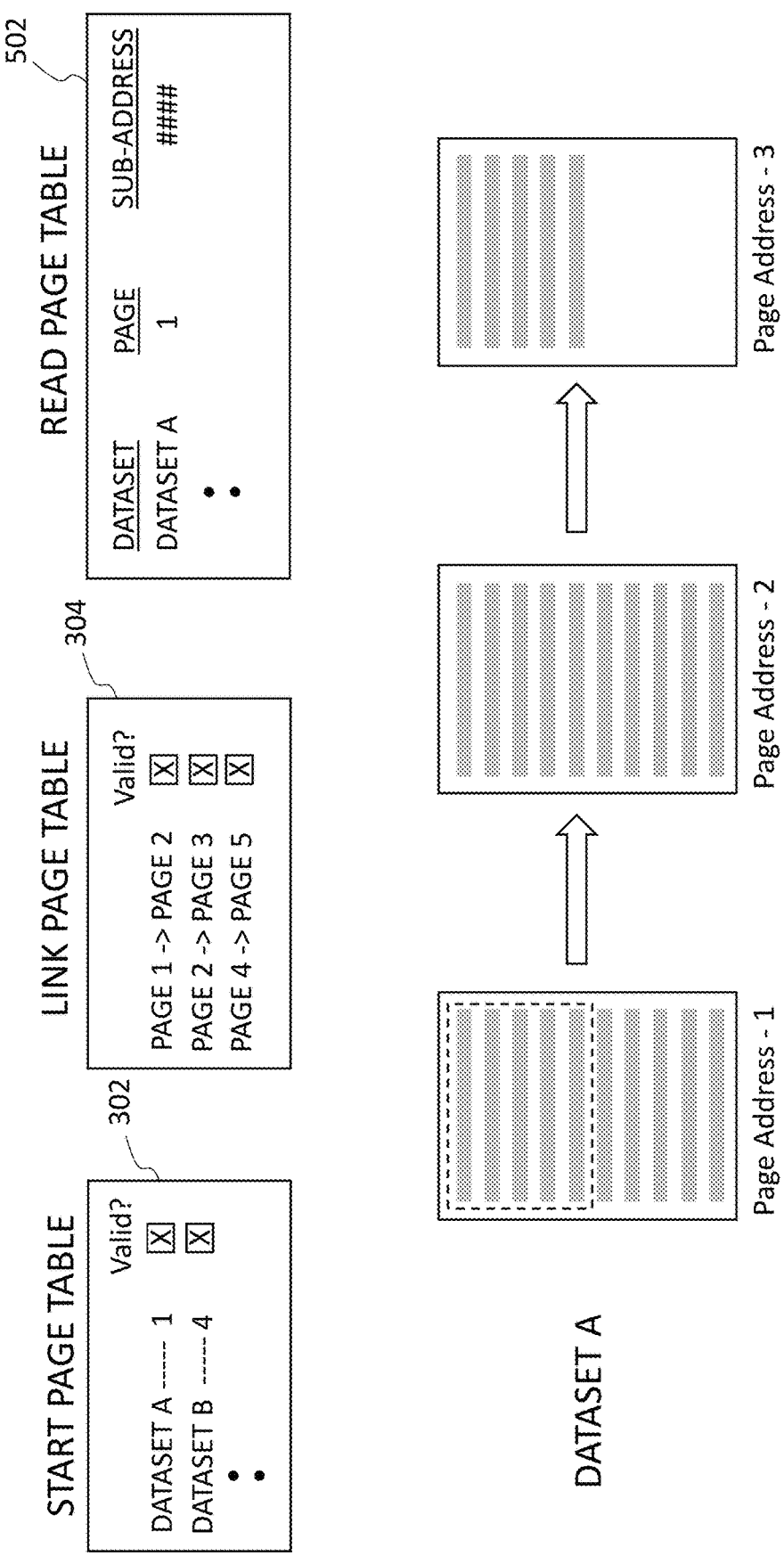
FIGS. 5A-5C graphically illustrate a read process flow using linked memory pages, in accordance with an embodiment of the present disclosure.
Figure 5B:
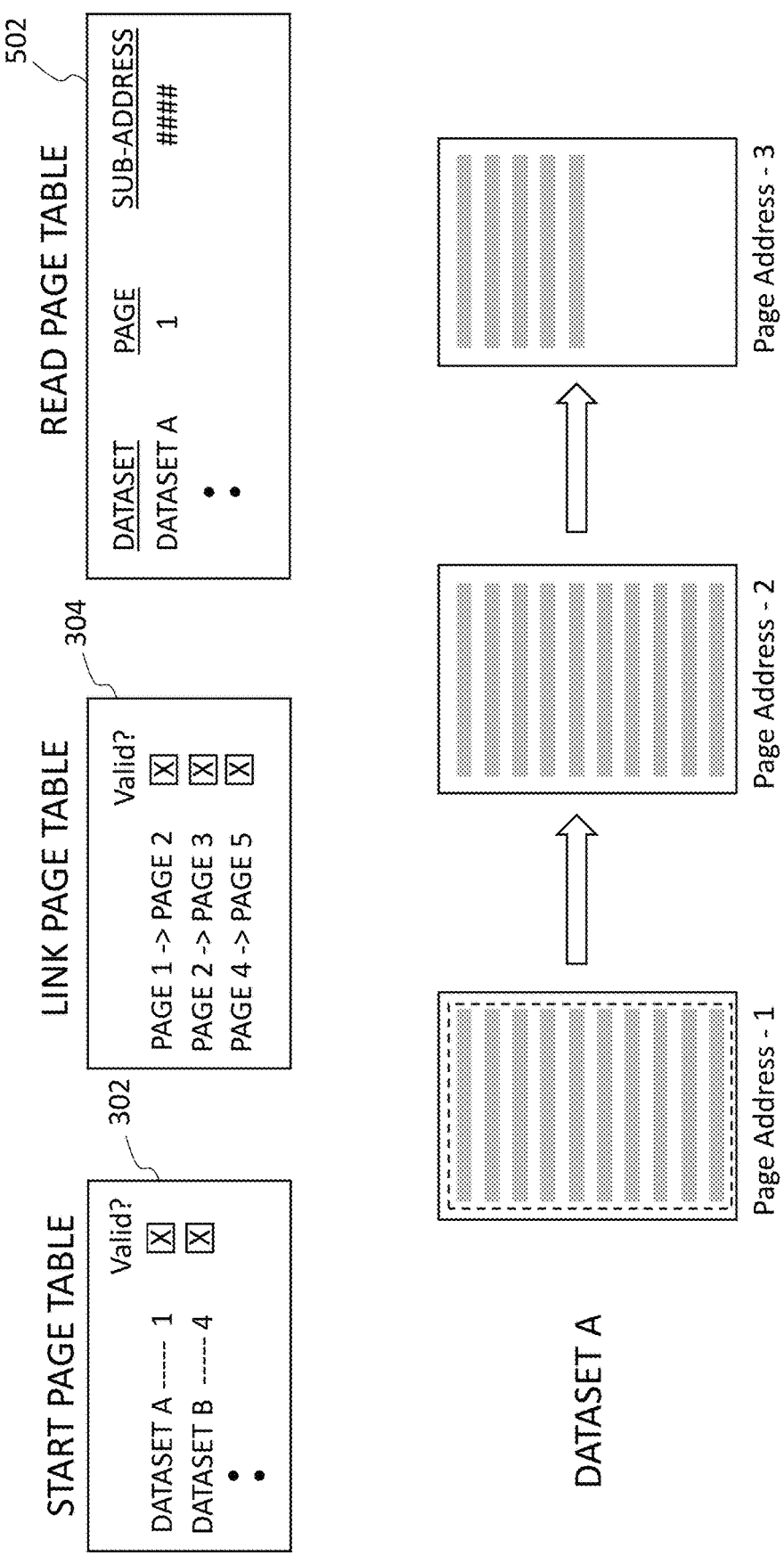
Figure 5C:
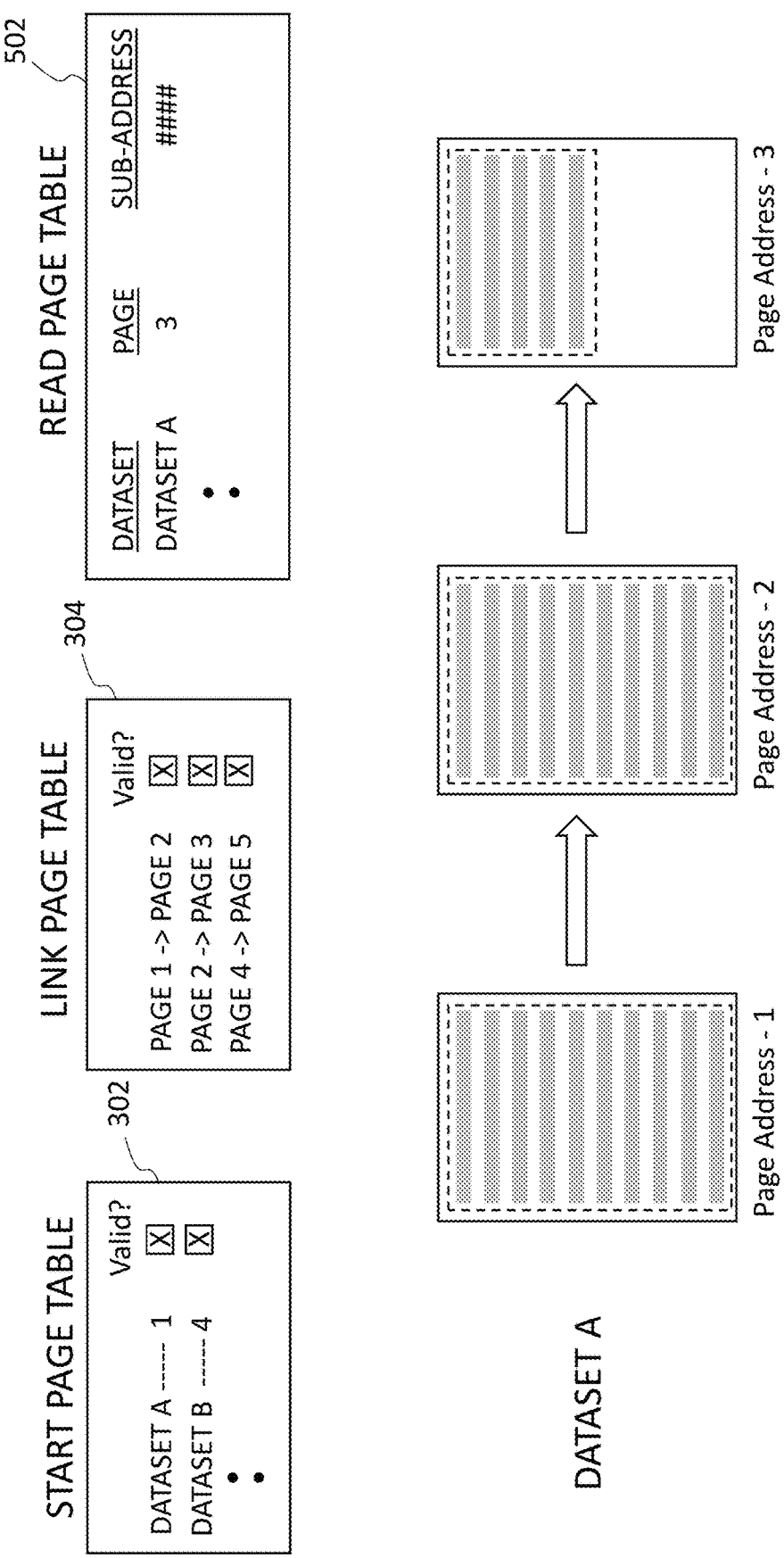

FIGS. 5A-5C illustrate a read operation for an example dataset A, according to an embodiment. FIG. 5A illustrates the initialization of the read operation where data is being read from page 1. Start page table 302 is accessed when receiving the read request to determine which page to begin with. The read request for dataset A is found to start at page 1 based on start page table 302. The dotted box represents the data that has been read so far up to the moment in time captured in FIG. 5A. The remaining data from dataset A will be read as time progresses. Thus, in the illustrated example, about half of the data on page 1 has been read and a read page table 502 is used to track the progress of the data read on page 1. Read page table 502 works in a similar way to write page table 404, according to an embodiment. As the data words are being read on page 1, read page table 502 is used to track the page and the sub-address where the read is occurring. According to an embodiment, the sub-address is continually updated as the read progresses, and the page address is updated when reading begins on a new page.

FIG. 5B illustrates a continuation of the read operation where the entire first page 1 has been read, according to an embodiment. At this point, link page table 304 is consulted to see if there is a linked page associated with page 1. Link page table 304 indicates that page 1 does link to page 2, and thus the data read operation would continue reading the data stored in page 2. After reading all of the data in page 1, the sub-address field associated with dataset A in read page table 502 may be cleared (e.g., identifies the first sub-address of a given page) to begin again with reading data from the top of page 2. Additionally, according to some embodiments, the page address associated with dataset A in read page table 502 may be updated to reflect that reads are now occurring on page 2.

FIG. 5C illustrates a continuation of the read operation where all data has been successfully read across all pages associated with dataset A, according to an embodiment. The data from dataset A continues to be read from the end of page 2 to the beginning of page 3 based on link page table 304. In some embodiments, if there is no further data to be read on page 3, the read operation ends. In some embodiments, the read operation ends when the current read position identified in read page table 502 for dataset A matches the associated final data write position identified in write page table 404 for dataset A.

Figure 6A:
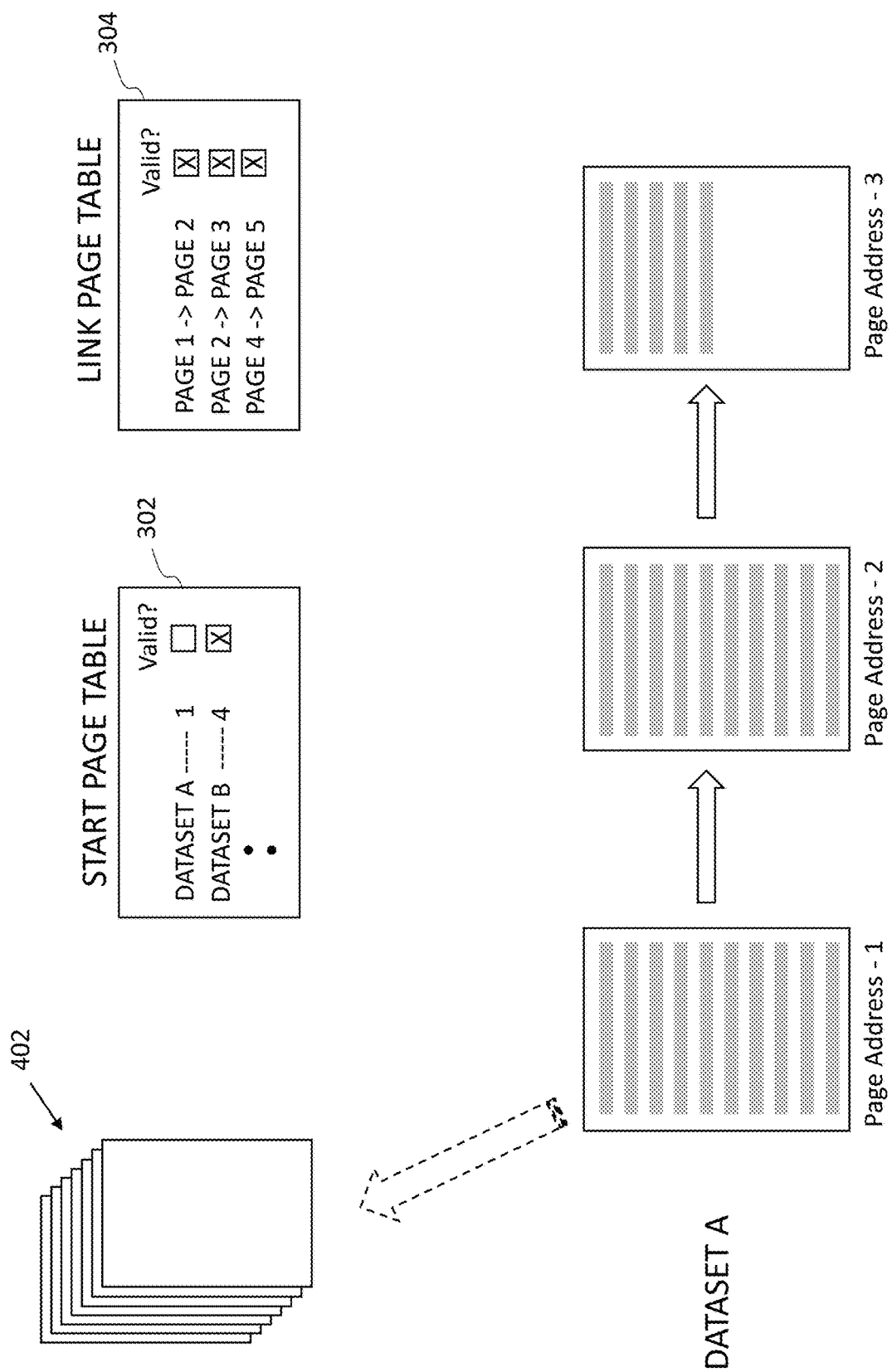
FIGS. 6A and 6B graphically illustrate an erase process using linked memory pages, in accordance with an embodiment of the present disclosure.
Figure 6B:
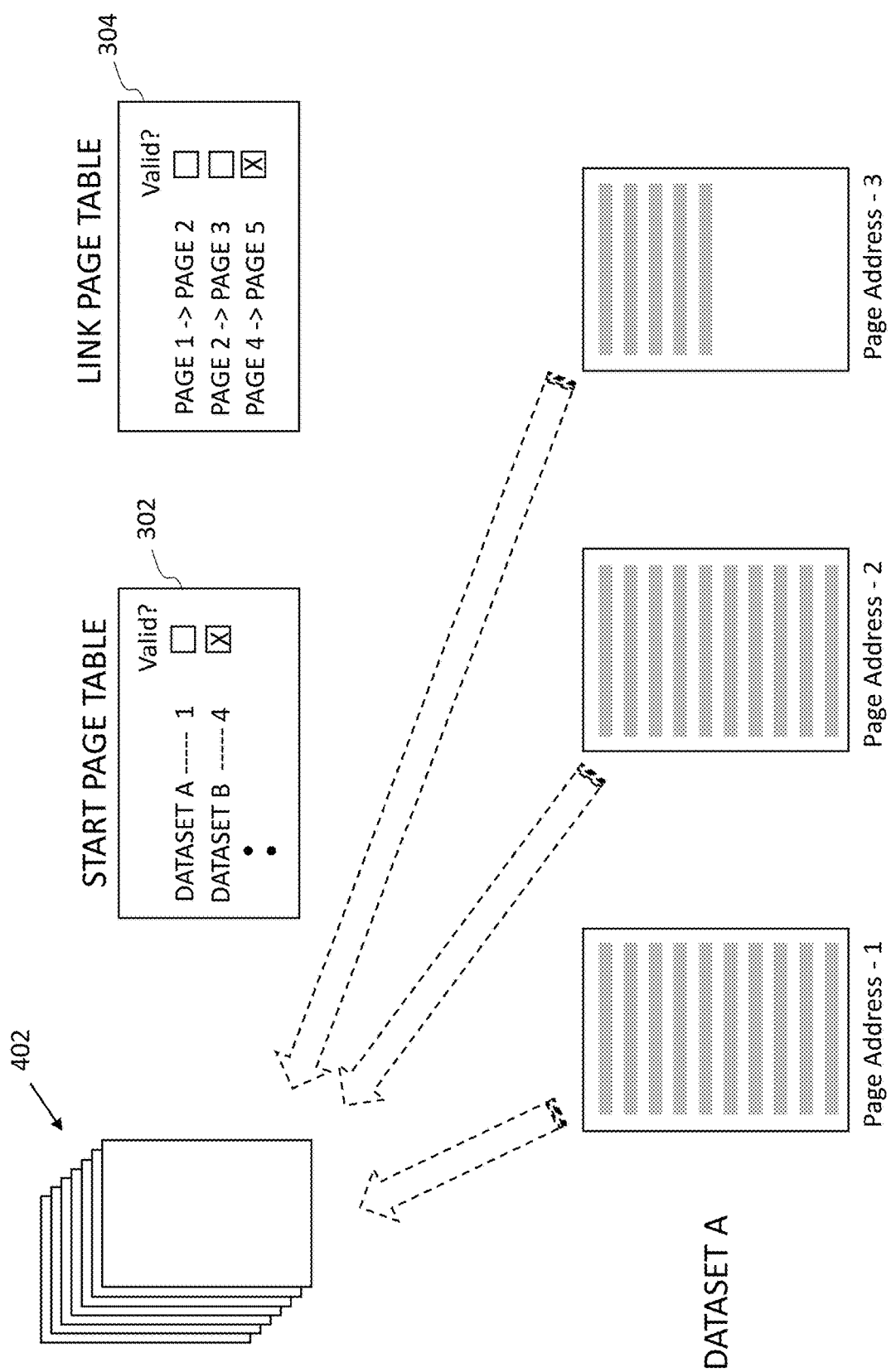

FIGS. 6A and 6B illustrate an erase operation for example dataset A, according to an embodiment. FIG. 6A illustrates the initialization of the erase operation where a request is received to erase dataset A. The entry for database A in start page table 302 is found and invalidated to indicate that this page (e.g., page 1 in this example) is now available for future data writes. According to an embodiment, page 1 is effectively returned to page repository 402 to possibly be selected again during a future data write operation. Note that the actual data stored on page 1 is not necessarily erased, rather, dataset A can no longer be found in the memory by applications requesting it because its start page table entry has been invalidated. In some embodiments, a check is done after clearing the start page table to see if anything is currently reading the dataset to be erased, and if something is reading it then the erase operation will be paused until the read is complete. This allows read operations that are currently in progress an opportunity to finish.

FIG. 6B illustrates a continuation of the erase operation where any linked pages of dataset A are also invalidated within link page table 304. Similar to what happened with the first page of the dataset, the one or more linked pages (in this case, pages 2 and 3) are also effectively returned to page repository 402 to possibly be selected again during a future data write operation. Note that the actual data stored on pages 1 and 3 is not necessarily erased, rather, these pages can no longer be accessed by any future read or erase requests because the link page table entries have been invalidated.

Figure 7:
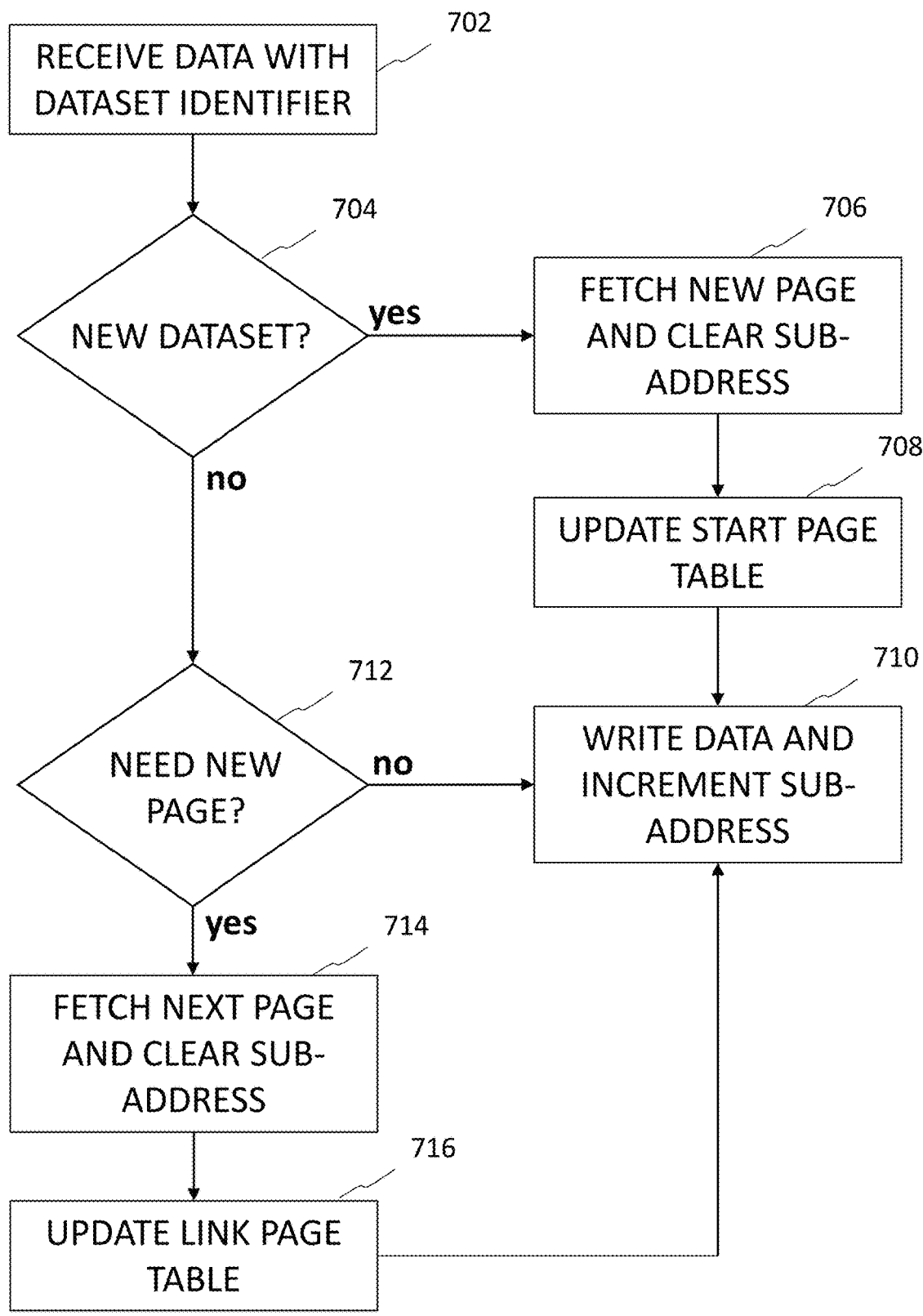
FIG. 7 is a flow chart of an example data write method, in accordance with an embodiment of the present disclosure.

FIG. 7 illustrates an example flow diagram having various operations of a data write method 700, according to an embodiment. Method 700 may be performed, for example, in whole or in part by memory interface 106. More specifically, method 700 may be performed in whole or in part by write module 108. The operations, functions, or actions described in the respective blocks of example method 700 may be stored as computer-executable instructions in a non-transitory computer-readable medium, such as a memory and/or a data storage of a computing system. As will be further appreciated in light of this disclosure, for this and other processes and methods disclosed herein, the functions performed in method 700 may be implemented in a differing order. Additionally, or alternatively, two or more operations may be performed at the same time or otherwise in an overlapping contemporaneous fashion.

Method 700 begins with block 702 where one or more data words to be written are received along with a dataset identifier, according to an embodiment. The dataset identifier indicates the dataset (e.g., dataset A, dataset B, etc.) that the one or more data words belong to.

At block 704, a determination is made whether or not the received one or more words form the beginning of a new dataset, or whether they are part of an existing dataset, according to an embodiment. If the dataset identifier is not found within, for example, the start page table, then the dataset is a new dataset and method 700 continues to block 706. Otherwise, the one or more data words to be written are part of an existing dataset and method 700 continues to block 712.

At block 706, a new page is fetched from the page repository to act as the first page of the new dataset, according to an embodiment. The sub-address associated with the new dataset in the write page table may also be cleared to ensure that it begins tracking the data writes correctly at the beginning of the first page.

At block 708 the start page table is updated to identify the first page of the new dataset. The entry for the new dataset in the start page table may also be flagged as valid to support the determination made as part of block 704 and also to ensure that future read and erase transactions know that there is valid data stored.

At block 710, the one or more received data words are written to the memory. If a new first page had just been fetched, then the one or more data words will be written starting at the beginning of the first page. As the data writes occur, the sub-address field associated with the dataset in the write page table is updated to track the sub-address on the page that the writes are occurring. The one or more data words are written sequentially on the given memory page. In some embodiments, the data words may be written to the memory page in a different order.

As noted above, method 700 proceeds from block 704 to block 712 if the received one or more data words are part of an existing dataset. At block 712, a determination is made whether or not a new page is needed. If there is enough space on the current page to write the one or more data words, then method 700 continues to block 710 where the data words are written to the current page. As the data writes occur, the sub-address field associated with the dataset in the write page table is updated to track the sub-address on the page that the writes are occurring.

If the current page of the dataset is full, then another page will be needed to complete the write of the one or more received data words and method 700 continues with block 714. At block 714, another page is fetched from the page repository to be the next page in the dataset, according to an embodiment. The sub-address associated with the dataset in the write page table may also be cleared to ensure that it begins tracking the data writes correctly at the beginning of the next linked page.

At block 716 the link page table is updated to identify the link between the previous page in the dataset and the next page of the dataset fetched in block 714, according to an embodiment. An entry in the link table may be added to identify the new address link between the two pages. The entry for the linked relationship in the link page table may also be flagged as valid to ensure that the dataset is kept together for future read and erase operations.

Once the next page has been fetched and linked with the previous page of the dataset, method 700 continues to block 710 where the one or more data words is written to the next page. The sub-address associated with the dataset in the write page table is updated to reflect the position of the write occurring on the page. In some embodiments method 700 is pipelined to support multiple simultaneous write operations for different datasets. In this case the data words for each dataset would be interleaved and the current page and subaddress would be stored in the write page table for each dataset.

Figure 8:
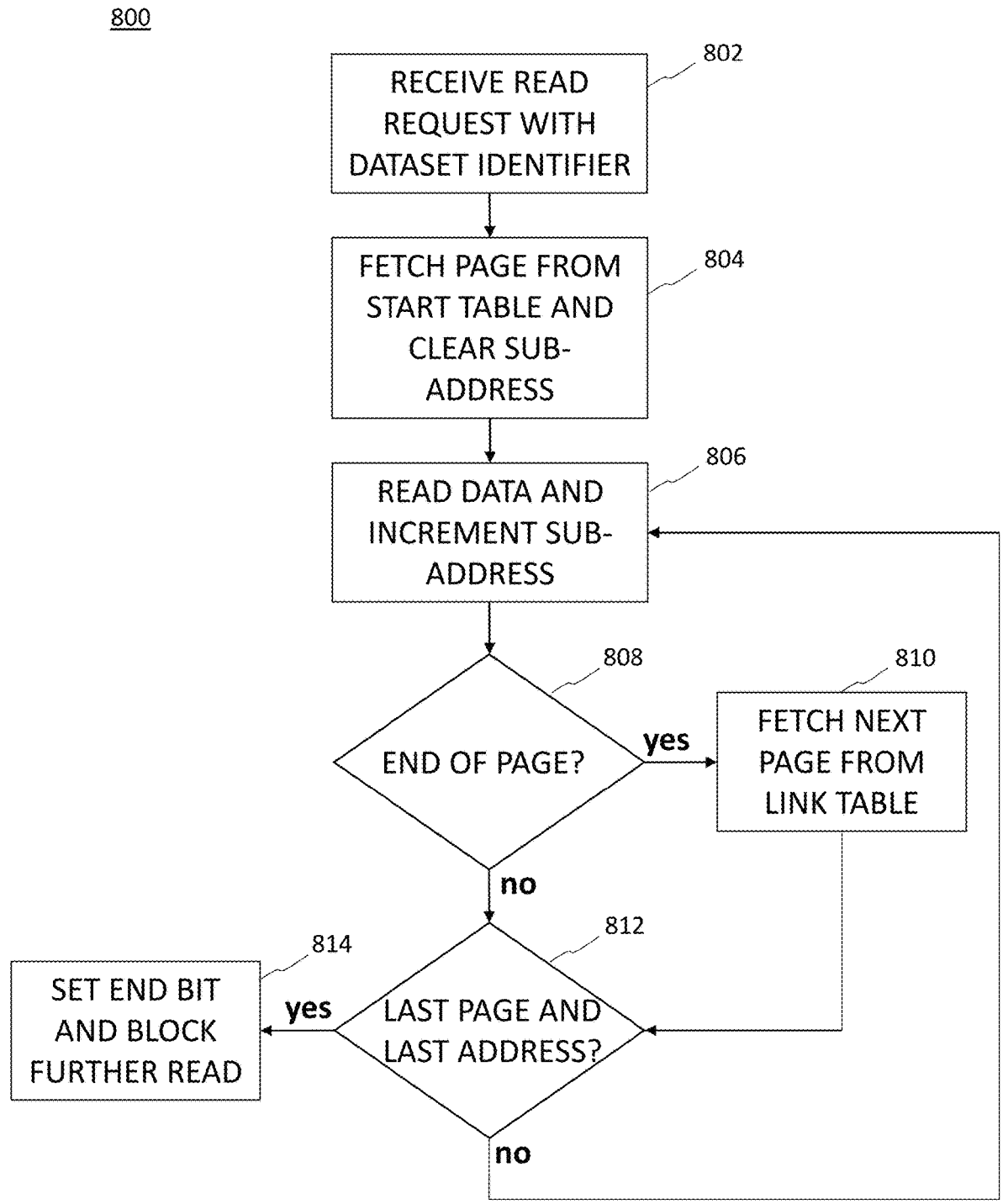
FIG. 8 is a flow chart of an example data read method, in accordance with an embodiment of the present disclosure.

FIG. 8 illustrates an example flow diagram having various operations of a data read method 800, according to an embodiment. Method 800 may be performed, for example, in whole or in part by memory interface 106. More specifically, method 800 may be performed in whole or in part by read module 110. The operations, functions, or actions described in the respective blocks of example method 800 may be stored as computer-executable instructions in a non-transitory computer-readable medium, such as a memory and/or a data storage of a computing system. As will be further appreciated in light of this disclosure, for this and other processes and methods disclosed herein, the functions performed in method 800 may be implemented in a differing order. Additionally, or alternatively, two or more operations may be performed at the same time or otherwise in an overlapping contemporaneous fashion.

Method 800 begins with block 802 where a request to read a particular dataset is received, according to an embodiment. The read request includes a dataset identifier (e.g., dataset A, dataset B, etc.) that indicates which dataset to begin reading the data words from.

At block 804, the first page of the dataset is fetched by accessing the start page table and fetching the start page associated with the dataset to be read, according to an embodiment. The read page table may also be updated for the requested dataset. For example, the entry for the dataset in the read page table may be changed to indicate the fetched first page as the current page to be read, while the sub-address may be set or cleared to indicate the read beginning at the start of the first page. If there is no valid start table entry for a given dataset then the read operation immediately ends and an error flag is returned.

At block 806, one or more data words are read on the current page and the sub-address field from the read page table is correspondingly updated, according to an embodiment. The data words are read sequentially as they are stored on the given memory page. In some embodiments, the data words may be read from the memory page in a different order.

At block 808, a determination is made if the end of the current page has been reached during the read operation. If the end of the page has been reached, and there is more data to be read, then method 800 proceeds to block 810 where the link page table is consulted to fetch the next page in the dataset, according to an embodiment. The current page address may be used to find the next linked page address in the link page table. The sub-address associated with the dataset in the read page table may also be cleared to ensure that it begins tracking the data reads correctly at the beginning of the next linked page.

At block 812, another determination is made regarding whether the last page and last address of the dataset has been reached for the read operation, according to an embodiment. In one example, the last page and last address is reached if the last word of the dataset is read on a given page and there is no further data stored on the given page. In another example, the last page and last address of the read operation for a given dataset is reached when the current page and sub-address of the read page table matches the page and sub-address of the write page table for the given dataset. If the last page and last address has been reached, then method 800 continues to block 814 where an end bit or flag is set to indicate that the read is completed, and any further reading of the dataset is blocked until a new read request for that dataset is received and we start again at block 802. If the last page and last address of the dataset has not been reached, then more data needs to be read from the dataset and method 800 loops back to block 806 to continue reading more data words of the dataset. In some embodiments method 800 is pipelined and supports multiple simultaneous reads of the same or different datasets. The current read page and sub-address are stored in the read page table for each of the different read operations.

Figure 9:
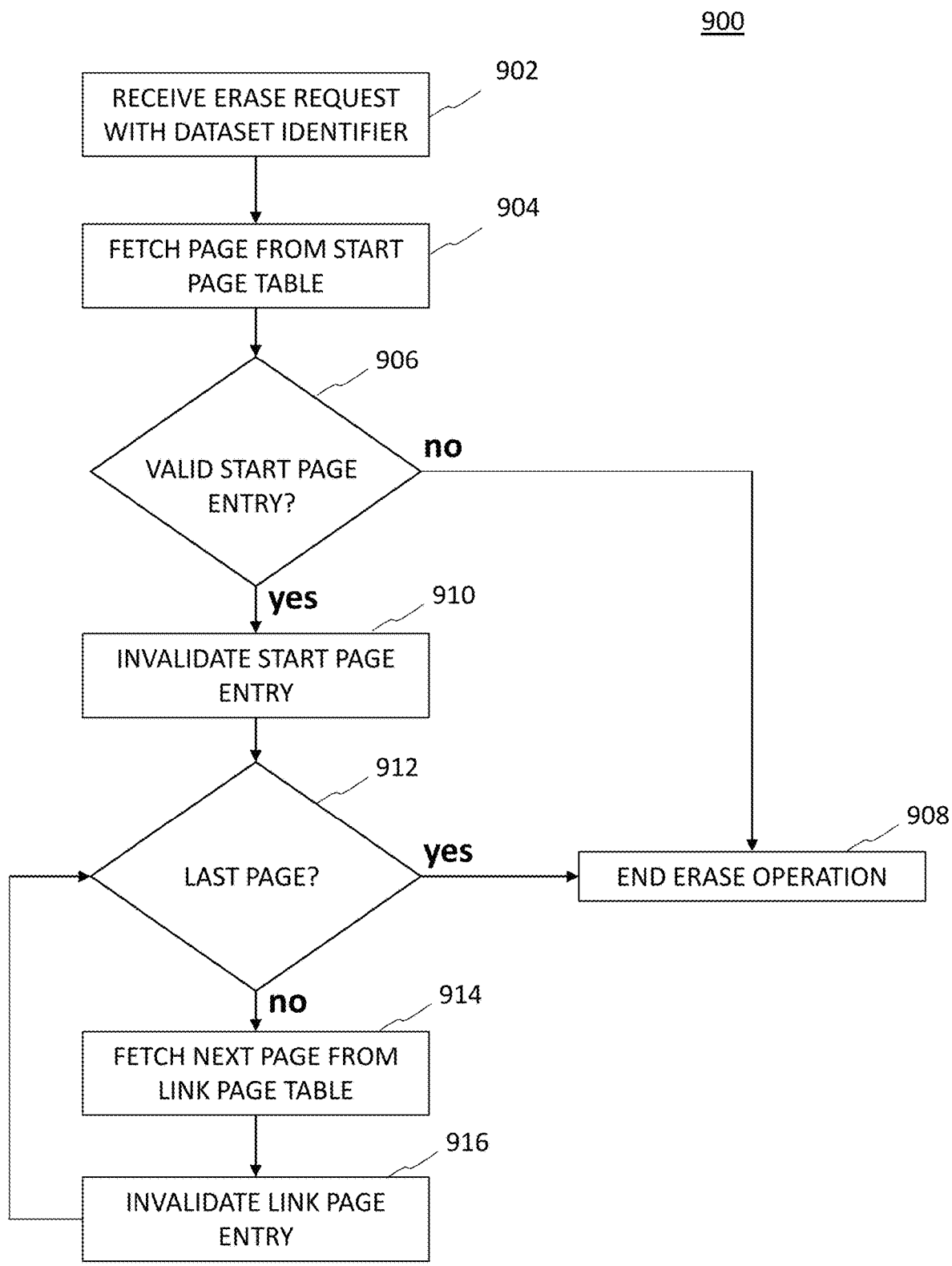
FIG. 9 is a flow chart of an example data erase method, in accordance with an embodiment of the present disclosure.

FIG. 9 illustrates an example flow diagram having various operations of a data erase method 900, according to an embodiment. Method 900 may be performed, for example, in whole or in part by memory interface 106. More specifically, method 900 may be performed in whole or in part by erase module 112. The operations, functions, or actions described in the respective blocks of example method 900 may be stored as computer-executable instructions in a non-transitory computer-readable medium, such as a memory and/or a data storage of a computing system. As will be further appreciated in light of this disclosure, for this and other processes and methods disclosed herein, the functions performed in method 900 may be implemented in a differing order. Additionally, or alternatively, two or more operations may be performed at the same time or otherwise in an overlapping contemporaneous fashion.

Method 900 begins with block 902 where a request to erase a particular dataset is received, according to an embodiment. The erase request includes a dataset identifier (e.g., dataset A, dataset B, etc.) that indicates which dataset is to be erased.

At block 904, the first page of the dataset is fetched by accessing the start page table and fetching the start page associated with the dataset to be erased, according to an embodiment.

At block 906, a determination is made whether or not the start page entry associated with the dataset in the start page table is valid. If the entry is not valid, then the erase operation immediately ends at block 908. This may occur if an erase request is made for a dataset that has already been erased. However, if the entry for the dataset in the start page table is valid, then the dataset is stored in memory and the erase operation can continue with block 910.

At block 910, the start page entry for the dataset in the start page table is invalidated, according to an embodiment. In one example, invalidating the entry involves clearing a valid bit or valid flag associated with the entry. In another example, invalidating the entry involves removing the entry from the start page table. In either case, the end result is the same in that the first page of the dataset is no longer identified in the start page table, according to an embodiment. Once the first page of the dataset has been invalidated in the start page table, the first page is effectively returned to a page repository to be used again for future data write operations.

In some embodiments, following the invalidating of the start page entry for the dataset, a determination is made whether the recently invalidated dataset is currently being read from. If the dataset is being read from, then the erase operation effectively pauses until the read operation is complete. The read operation is able to continue since the link page table entries for the dataset have not yet been invalidated. Once a determination is made that the dataset is not currently being read from, then the erase operation continues with block 912.

At block 912, another determination is made whether or not the current page is the last page of the dataset. This determination may be made by using the link page table to see if another page is linked to the current page. If no page is linked to the current page, then there are no further pages to invalidate in the dataset and the erase operation ends at block 908. However, if another page is linked to the current page, then further one or more pages exist in the dataset and method 900 continues with block 914.

At block 914, the link page table is consulted to fetch the next page in the dataset, according to an embodiment. The current page address may be used to find the next linked page address in the link page table. After fetching the next page, such that it is now the current link page, method 900 proceeds with block 916 where the entry associated with the current link page of the dataset in the link page table is invalidated, according to an embodiment. In one example, invalidating the entry involves clearing a valid bit or valid flag associated with the entry. In another example, invalidating the entry involves removing the entry from the link page table. In either case, the end result is the same in that the current link page of the dataset is no longer identified as a linked part of the dataset, according to an embodiment. Once the current link page of the dataset has been invalidated in the link page table, the current link page is effectively returned to a page repository to be used again for future data write operations. After invalidating the current link page, method 900 loops back to block 912 to determine if any more link pages exist in the dataset.

Example Computing Platform

Figure 10:
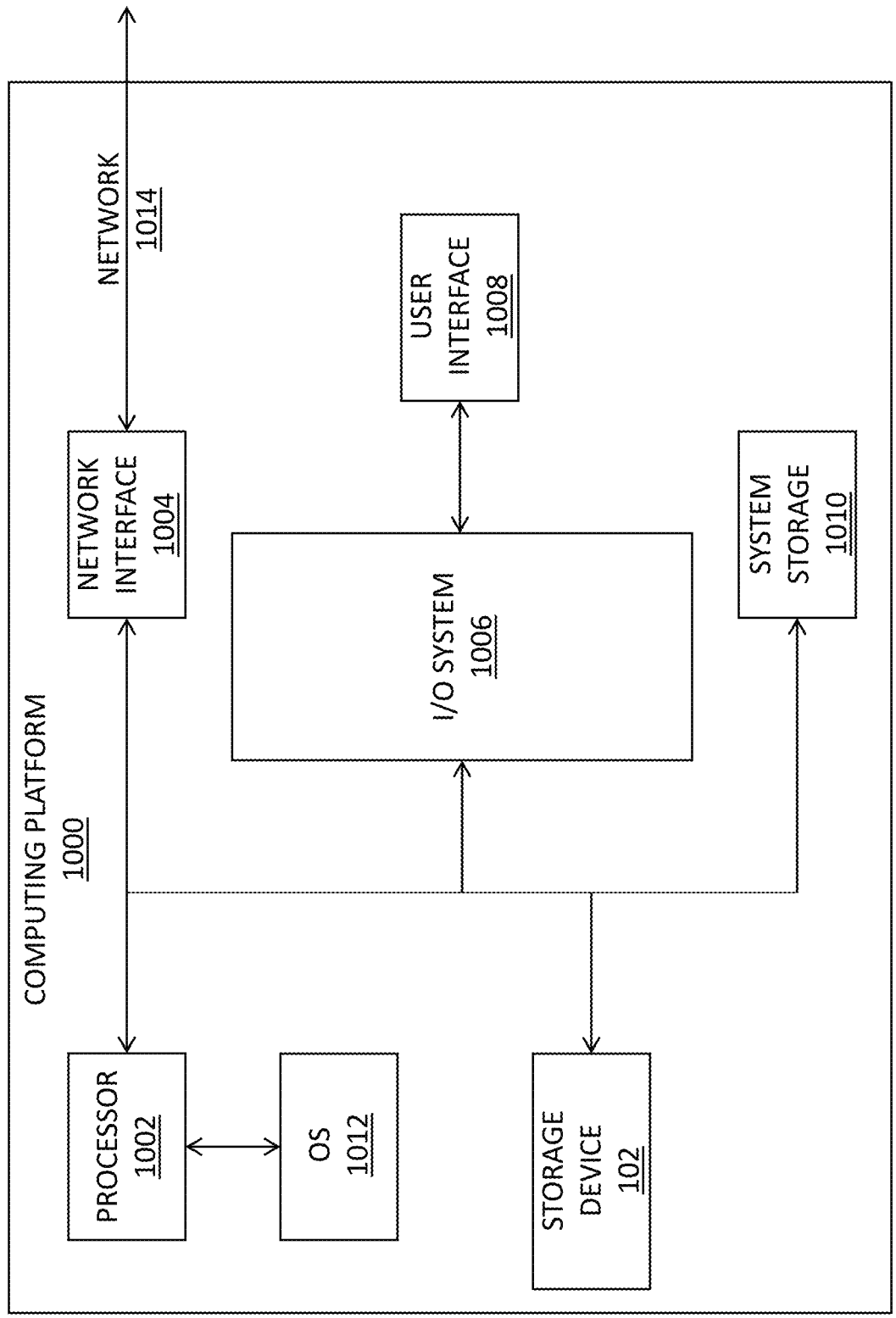
FIG. 10 illustrates a block diagram of an example computing platform that may include a storage device, in accordance with an embodiment of the present disclosure.

FIG. 10 illustrates an example computing platform 1000 that interfaces with a storage device 102, configured in accordance with certain embodiments of the present disclosure. In some embodiments, computing platform 1000 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. Computing platform 1000 may be incorporated within an embedded system.

In some embodiments, computing platform 1000 may comprise any combination of a processor 1002, storage device 102, a network interface 1004, an input/output (I/O) system 1006, a user interface 1008, and system storage 1010. In some embodiments, one or more of the functions of storage device 102 may be executed by processor 1002. In some embodiments, storage device 102 includes an FPGA or ASIC designed to execute one or more functions associated with writing, reading, and/or erasing data on memory in storage device 102. As can be further seen, a bus and/or interconnect is also provided to allow for communication between the various components listed above and/or other components not shown. Computing platform 1000 can be coupled to a network 1014 through network interface 1004 to allow for communications with other computing devices, platforms, or resources. Other componentry and functionality not reflected in the block diagram of FIG. 10 will be apparent in light of this disclosure, and it will be appreciated that other embodiments are not limited to any particular hardware configuration.

Processor 1002 can be any suitable processor and may include one or more coprocessors or controllers to assist in control and processing operations associated with computing platform 1000. In some embodiments, processor 1002 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Storage device 102 may include any suitable type of digital storage including, for example, flash memory and/or random access memory (RAM). In some embodiments, storage device 102 may include various layers of memory hierarchy and/or memory caches, as is sometimes done. The memory within storage device 102 may be implemented as a volatile memory device such as, but not limited to, a RAM, dynamic RAM (DRAM), or static RAM (SRAM) device. System storage 1010 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 1002 may be configured to execute an Operating System (OS) 1012 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing platform 1000, and therefore may also be implemented using any suitable existing or subsequently-developed platform.

Network interface 1004 can be any appropriate network chip or chipset which allows for wired and/or wireless connection between other components of computing platform 1000 and/or network 1014, thereby enabling computing platform 1000 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1006 may be configured to interface between various I/O devices and other components of computing platform 1000. I/O devices may include, but not be limited to, a user interface 1008. User interface 1008 may include devices (not shown) such as a display element, touchpad, keyboard, mouse, and speaker, etc. I/O system 1006 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1002 or any chipset of computing platform 1000.

It will be appreciated that in some embodiments, the various components of the computing platform 1000 may be combined or integrated in a system-on-a-chip (SoC) architecture. In some embodiments, the components may be hardware components, firmware components, software components or any suitable combination of hardware, firmware or software.

In various embodiments, computing platform 1000 may be implemented as a wireless system, a wired system, or a combination of both. When implemented as a wireless system, computing platform 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Some of the embodiments discussed herein may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Some of the embodiments discussed herein may be implemented in hardware such as a field programmable gate array (FPGA) or application specific integrated circuit (ASIC) that have functionality defined by hardware programming language such as Very High-Speed Integrated Circuit Hardware Description Language (VHDL) or Verilog. The hardware programming language that defines the functions of the hardware may be stored on any machine-readable medium or article. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, is a functional apparatus and may comprise, for example, singly or in any combination, hardwired circuitry, programmable circuitry such as one or more computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software stored in a machine-readable medium and that can be executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Thus, a circuit or circuitry is a functional physical apparatus that can be any of integrated circuitry, printed circuit board circuitry, gate-level logic, analog and/or digital circuitry, one or more programmed processors or processing entities (e.g., combination of instructions and one or more processors configured to execute those instructions).

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a method of dynamically allocating memory for one or more datasets. The method includes dividing at least a portion of a memory into a plurality of pages, wherein each page of the plurality of pages has a predetermined size; providing a start page table for the one or more datasets, the start page table comprising one or more entries with each entry including a page number that corresponds to a page which includes a first part of a corresponding dataset of the one or more datasets; providing a link page table for the one or more datasets, the link page table comprising one or more entries with each entry including an address for a current page of a given dataset of the one or more datasets and an address for a next page of the given dataset; and providing at least one of a write page table that includes a first sub-address of a first page where at least a portion of a corresponding dataset is being written, and a read page table that includes a second sub-address of a second page where at least a portion of a corresponding dataset is being read.

Example 2 includes the subject matter of Example 1, further comprising executing a memory write operation that includes receiving a data word to be written along with an associated dataset identifier and determining if the dataset identifier indicates a new dataset to be written. In response to the dataset identifier indicating a new dataset, the method includes fetching an available page of the plurality of pages as a start page for the new dataset, updating the start page table to include the page number of the start page corresponding with the new dataset, and writing the data word to the start page.

Example 3 includes the subject matter of Example 2, further comprising, in response to the dataset identifier indicating an existing dataset, determining if a new page is required to write the data word. In response to determining that a new page is not required, the method includes writing the data word at the first sub-address of the current page indicated by the write page table for the existing dataset. In response to determining that a new page is required, the method includes fetching a next available page of the plurality of pages as a next linked page for the existing dataset, updating the link page table to indicate the next linked page follows a previous page of the existing dataset, and writing at least a portion of the data word to the next linked page.

Example 4 includes the subject matter of Example 3, further comprising clearing the first sub-address associated with the existing dataset in the write page table in response to determining that the new page is required.

Example 5 includes the subject matter of Example 3 or 4, further comprising incrementing the first sub-address after writing the data word or the at least a portion of the data word.

Example 6 includes the subject matter of any one of Examples 2-5, further comprising clearing the first sub-address associated with the new dataset in the write page table.

Example 7 includes the subject matter of any one of Examples 1-6, further comprising executing a memory read operation that comprises receiving a read request along with an associated dataset identifier; fetching a start page for the dataset associated with the dataset identifier as indicated by the start page table; reading data from the start page; and incrementing the second sub-address upon reading the data.

Example 8 includes the subject matter of Example 7, further comprising determining if the end of a current page of the dataset has been reached. In response to reaching the end of the current page, the method includes fetching a next page of the dataset as indicated by the link page table; and continuing to read data from the next page.

Example 9 includes the subject matter of Example 7 or 8, further comprising determining if a last sub-address of a last page of the dataset has been reached. In response to determining that the last sub-address of the last page of the dataset has been reached, the method includes setting an end bit to indicate an end to the read operation, and blocking any further data from being read until another memory read operation is executed.

Example 10 includes the subject matter of any one of Examples 1-9, further comprising executing a memory erase operation that comprises receiving an erase request along with an associated dataset identifier; fetching a start page for the dataset associated with the dataset identifier as indicated by the start page table; and determining if the fetched start page is valid. In response to determining that the fetched start page is valid, the method includes updating the start page table to flag the fetched start page as being invalid.

Example 11 includes the subject matter of Example 10, further comprising determining if a current fetched page is a last page of the dataset. In response to determining that the current fetched page is not the last page of the dataset, the method includes fetching a next page of the dataset as indicated by the link page table, and changing the link page table to flag the fetched next page as being invalid.

Example 12 includes the subject matter of any one of Examples 1-11, wherein the write page table further includes a first address of the first page where the portion of the corresponding dataset is being written, and the read page table further includes a second address of the second page where the portion of the corresponding dataset is being read.

Example 13 is a storage device designed to dynamically allocate memory for one or more datasets. The storage device includes one or more memory devices comprising a plurality of pages having a predetermined size, and an integrated circuit (IC) operatively coupled with the one or more memory devices. The IC includes a start page module configured to provide a start page table, the start page table having a page number that includes a first part of a corresponding dataset of the one or more datasets; a link page module configured to provide a link page table that indicates an address for a current page of a given dataset and an address for a next page of the given dataset of the one or more datasets, the link page module also configured to provide the address for the next page in response to receiving an address for an associated current page; a write page module configured to provide a write page table that includes a first sub-address of a first page where a portion of a corresponding dataset is being written; and a read page module configured to provide a read page table that includes a second sub-address of a second page where a portion of a corresponding dataset is being read.

Example 14 includes the subject matter of Example 13, wherein the IC further comprises a write module configured to receive a data word to be written along with an associated dataset identifier and determine if the dataset identifier indicates a new dataset to be written. In response to the dataset identifier indicating a new dataset, the write module is further configured to fetch an available page of the plurality of pages as a start page for the new dataset; update the start page table to include the page number of the start page corresponding with the new dataset; and write the data word to the start page.

Example 15 includes the subject matter of Example 14, wherein the write module is further configured to, in response to the dataset identifier indicating an existing dataset, determine if a new page is required to write the data word. In response to determining that a new page is not required, the write module is configured to write the data word at the first sub-address of the current page indicated by the write page table for the existing dataset. In response to determining that a new page is required, the write module is configured to fetch a next available page of the plurality of pages as a next linked page for the existing dataset; update the link page table to indicate the next linked page as following a previous page of the existing dataset; and write at least a portion of the data word to the next linked page.

Example 16 includes the subject matter of Example 15, wherein the write module is further configured to clear the first sub-address associated with the existing dataset in the write page table in response to determining that the new page is required.

Example 17 includes the subject matter of Example 15 or 16, wherein the write module is further configured to increment the first sub-address after writing the data word or the at least a portion of the data word.

Example 18 includes the subject matter of any one of Examples 14-17, wherein the write module is further configured to clear the first sub-address associated with the new dataset in the write page table.

Example 19 includes the subject matter of any one of Examples 13-18, wherein the IC further comprises a read module configured to receive a read request along with an associated dataset identifier; fetch a start page for the dataset associated with the dataset identifier as indicated by the start page table; read data from the start page; and increment the second sub-address upon reading the data.

Example 20 includes the subject matter of Example 19, wherein the read module is further configured to determine if the end of a current page of the dataset has been reached. In response to reaching the end of the current page, the read module is further configured to fetch a next page of the dataset as indicated by the link page table; and continue to read data from the next page.

Example 21 includes the subject matter of Example 19 or 20, wherein the read module is further configured to determine if a last sub-address of a last page of the dataset has been reached. In response to determining that the last sub-address of the last page of the dataset has been reached, the read module is further configured to set an end bit and block any further data from being read until another read request is received.

Example 22 includes the subject matter of any one of Examples 13-21, wherein the IC further comprises an erase module configured to receive an erase request along with an associated dataset identifier; fetch a start page for the dataset associated with the dataset identifier as indicated by the start page table; and determine if the fetched start page is valid. In response to determining that the fetched start page is valid, the erase module is configured to update the start page table to flag the fetched start page as being invalid.

Example 23 includes the subject matter of Example 22, wherein the erase module is further configured to determine if a current fetched page is a last page of the dataset. In response to determining that the current fetched page is not the last page of the dataset, the erase module is configured to fetch a next page of the dataset as indicated by the link page table; and change the link page table to flag the fetched next page as being invalid.

Example 24 includes the subject matter of any one of Examples 13-23, wherein the write page table further includes a first address of the first page where the portion of the corresponding dataset is being written, and the read page table further includes a second address of the second page where the portion of the corresponding dataset is being read.

Example 25 is a computer program product including one or more non-transitory machine-readable media having instructions encoded thereon that, when executed by a processor, cause the processor to generate a layout for an integrated circuit (IC) that dynamically allocates memory for one or more datasets. The IC comprises a start page module configured to provide a start page table, the start page table having a page number that includes a first part of a corresponding dataset of the one or more datasets; a link page module configured to provide a link page table that indicates an address for a current page of a given dataset and an address for a next page of the given dataset of the one or more datasets, the link page module also configured to provide the address for the next page in response to receiving an address for an associated current page; a write page module configured to provide a write page table that includes first sub-address of a first page where a portion of a corresponding dataset is being written; and a read page module configured to provide a read page table that includes a second sub-address of a second page where a portion of a corresponding dataset is being read.

Example 26 includes the subject matter of Example 25, wherein the IC further comprises a write module configured to receive a data word to be written along with an associated dataset identifier and determine if the dataset identifier indicates a new dataset to be written. In response to the dataset identifier indicating a new dataset, the write module is further configured to fetch an available page of the plurality of pages as a start page for the new dataset; update the start page table to include the page number of the start page corresponding with the new dataset; and write the data word to the start page.

Example 27 includes the subject matter of Example 26, wherein the write module is further configured to, in response to the dataset identifier indicating an existing dataset, determine if a new page is required to write the data word. In response to determining that a new page is not required, the write module is configured to write the data word at the first sub-address of the current page indicated by the write page table for the existing dataset. In response to determining that a new page is required, the write module is configured to fetch a next available page of the plurality of pages as a next linked page for the existing dataset; update the link page table to indicate the next linked page as following a previous page of the existing dataset; and write at least a portion of the data word to the next linked page.

Example 28 includes the subject matter of Example 27, wherein the write module is further configured to clear the first sub-address associated with the existing dataset in the write page table in response to determining that the new page is required.

Example 29 includes the subject matter of Example 27 or 28, wherein the write module is further configured to increment the first sub-address after writing the data word or the at least a portion of the data word.

Example 30 includes the subject matter of any one of Examples 26-29, wherein the write module is further configured to clear the first sub-address associated with the new dataset in the write page table.

Example 31 includes the subject matter of any one of Examples 25-30, wherein the IC further comprises a read module configured to receive a read request along with an associated dataset identifier; fetch a start page for the dataset associated with the dataset identifier as indicated by the start page table; read data from the start page; and increment the second sub-address upon reading the data.

Example 32 includes the subject matter of Example 31, wherein the read module is further configured to determine if the end of a current page of the dataset has been reached. In response to reaching the end of the current page, the read module is further configured to fetch a next page of the dataset as indicated by the link page table; and continue to read data from the next page.

Example 33 includes the subject matter of Example 31 or 32, wherein the read module is further configured to determine if a last sub-address of a last page of the dataset has been reached. In response to determining that the last sub-address of the last page of the dataset has been reached, the read module is further configured to set an end bit and block any further data from being read until another read request is received.

Example 34 includes the subject matter of any one of Examples 25-33, wherein the IC further comprises an erase module configured to receive an erase request along with an associated dataset identifier; fetch a start page for the dataset associated with the dataset identifier as indicated by the start page table; and determine if the fetched start page is valid. In response to determining that the fetched start page is valid, the erase module is configured to update the start page table to flag the fetched start page as being invalid.

Example 35 includes the subject matter of Example 34, wherein the erase module is further configured to determine if a current fetched page is a last page of the dataset. In response to determining that the current fetched page is not the last page of the dataset, the erase module is configured to fetch a next page of the dataset as indicated by the link page table; and change the link page table to flag the fetched next page as being invalid.

Example 36 includes the subject matter of any one of Examples 25-35, wherein the write page table further includes a first address of the first page where the portion of the corresponding dataset is being written, and the read page table further includes a second address of the second page where the portion of the corresponding dataset is being read.

What is claimed is:

1. A storage device designed to dynamically allocate memory for one or more datasets, comprising:
   one or more memory devices comprising a plurality of pages having a predetermined size; and
   an integrated circuit (IC) operatively coupled with the one or more memory devices and comprising:
      a start page module configured to provide a start page table, the start page table having a page number that includes a first part of a corresponding dataset of the one or more datasets;
      a link page module configured to provide a link page table that indicates an address for a current page of a given dataset and an address for a next page of the given dataset of the one or more datasets, the link page module also configured to provide the address for the next page in response to receiving an address for an associated current page;
      a write page module configured to provide a write page table that includes a first sub-address of a first page where a portion of a corresponding dataset is being written; and
      a read page module configured to provide a read page table that includes a second sub-address of a second page where a portion of a corresponding dataset is being read.

2. The storage device of claim 1, wherein the IC further comprises a write module configured to
   receive a data word to be written along with an associated dataset identifier;
   determine if the dataset identifier indicates a new dataset to be written;
   in response to the dataset identifier indicating a new dataset,
      fetch an available page of the plurality of pages as a start page for the new dataset;
      update the start page table to include the page number of the start page corresponding with the new dataset; and
      write the data word to the start page.

3. The storage device of claim 2, wherein the write module is further configured to, in response to the dataset identifier indicating an existing dataset,
   determine if a new page is required to write the data word;
   in response to determining that a new page is not required, write the data word at the first sub-address of the current page indicated by the write page table for the existing dataset;
   in response to determining that a new page is required,
      fetch a next available page of the plurality of pages as a next linked page for the existing dataset;
      update the link page table to indicate the next linked page as following a previous page of the existing dataset; and
      write at least a portion of the data word to the next linked page.

4. The storage device of claim 3, wherein the write module is further configured to increment the first sub-address after writing the data word or the at least a portion of the data word.

5. The storage device of claim 1, wherein the IC further comprises a read module configured to
   receive a read request along with an associated dataset identifier;
   fetch a start page for the dataset associated with the dataset identifier as indicated by the start page table;
   read data from the start page; and
   increment the second sub-address upon reading the data.

6. The storage device of claim 5, wherein the read module is further configured to
   determine if the end of a current page of the dataset has been reached;
   in response to reaching the end of the current page, fetch a next page of the dataset as indicated by the link page table; and
   continue to read data from the next page.

7. The storage device of claim 5, wherein the read module is further configured to
   determine if a last sub-address of a last page of the dataset has been reached; and
   in response to determining that the last sub-address of the last page of the dataset has been reached, set an end bit and block any further data from being read until another read request is received.

8. The storage device of claim 1, wherein the IC further comprises an erase module configured to
  receive an erase request along with an associated dataset identifier;
  fetch a start page for the dataset associated with the dataset identifier as indicated by the start page table;
  determine if the fetched start page is valid; and
  in response to determining that the fetched start page is valid, update the start page table to flag the fetched start page as being invalid.

9. The storage device of claim 8, wherein the erase module is further configured to
  determine if a current fetched page is a last page of the dataset;
  in response to determining that the current fetched page is not the last page of the dataset,
    fetch a next page of the dataset as indicated by the link page table; and
    change the link page table to flag the fetched next page as being invalid.

10. The storage device of claim 1, wherein the write page table further includes a first address of the first page where the portion of the corresponding dataset is being written, and the read page table further includes a second address of the second page where the portion of the corresponding dataset is being read.

11. A method of dynamically allocating memory for one or more datasets, the method comprising:
  dividing at least a portion of a memory into a plurality of pages, wherein each page of the plurality of pages has a predetermined size;
  providing a start page table for the one or more datasets, the start page table comprising one or more entries with each entry including a page number that corresponds to a page which includes a first part of a corresponding dataset of the one or more datasets;
  providing a link page table for the one or more datasets, the link page table comprising one or more entries with each entry including an address for a current page of a given dataset of the one or more datasets and an address for a next page of the given dataset; and
  providing at least one of a write page table that includes a first sub-address of a first page where at least a portion of a corresponding dataset is being written, and a read page table that includes a second sub-address of a second page where at least a portion of a corresponding dataset is being read.

12. The method of claim 11, further comprising executing a memory write operation that comprises
  receiving a data word to be written along with an associated dataset identifier;
  determining if the dataset identifier indicates a new dataset to be written; and
  in response to the dataset identifier indicating a new dataset,
    fetching an available page of the plurality of pages as a start page for the new dataset,
    updating the start page table to include the page number of the start page corresponding with the new dataset, and
    writing the data word to the start page.

13. The method of claim 12, further comprising, in response to the dataset identifier indicating an existing dataset:
  determining if a new page is required to write the data word;
  in response to determining that a new page is not required, writing the data word at the first sub-address of the current page indicated by the write page table for the existing dataset; and
  in response to determining that a new page is required,
    fetching a next available page of the plurality of pages as a next linked page for the existing dataset,
    updating the link page table to indicate the next linked page follows a previous page of the existing dataset, and
    writing at least a portion of the data word to the next linked page.

14. The method of claim 11, further comprising executing a memory read operation that comprises:
  receiving a read request along with an associated dataset identifier;
  fetching a start page for the dataset associated with the dataset identifier as indicated by the start page table;
  reading data from the start page; and
  incrementing the second sub-address upon reading the data.

15. The method of claim 14, further comprising:
  determining if the end of a current page of the dataset has been reached;
  in response to reaching the end of the current page, fetching a next page of the dataset as indicated by the link page table; and
  continuing to read data from the next page.

16. The method of claim 14, further comprising:
  determining if a last sub-address of a last page of the dataset has been reached; and
  in response to determining that the last sub-address of the last page of the dataset has been reached,
    setting an end bit to indicate an end to the read operation, and
    blocking any further data from being read until another memory read operation is executed.

17. The method of claim 11, further comprising executing a memory erase operation that comprises:
  receiving an erase request along with an associated dataset identifier;
  fetching a start page for the dataset associated with the dataset identifier as indicated by the start page table;
  determining if the fetched start page is valid; and
  in response to determining that the fetched start page is valid, updating the start page table to flag the fetched start page as being invalid.

18. The method of claim 17, further comprising:
  determining if a current fetched page is a last page of the dataset; and
  in response to determining that the current fetched page is not the last page of the dataset,
    fetching a next page of the dataset as indicated by the link page table, and
    changing the link page table to flag the fetched next page as being invalid.

19. The method of claim 11, wherein the write page table further includes a first address of the first page where the portion of the corresponding dataset is being written, and the read page table further includes a second address of the second page where the portion of the corresponding dataset is being read.

20. A computer program product including one or more non-transitory machine-readable media having instructions encoded thereon that, when executed by a processor, cause the processor to generate a layout for an integrated circuit (IC) that dynamically allocates memory for one or more datasets, wherein the IC comprises:
- a start page module configured to provide a start page table, the start page table having a page number that includes a first part of a corresponding dataset of the one or more datasets;
- a link page module configured to provide a link page table that indicates an address for a current page of a given dataset and an address for a next page of the given dataset of the one or more datasets, the link page module also configured to provide the address for the next page in response to receiving an address for an associated current page;
- a write page module configured to provide a write page table that includes first sub-address of a first page where a portion of a corresponding dataset is being written; and
- a read page module configured to provide a read page table that includes a second sub-address of a second page where a portion of a corresponding dataset is being read.

* * * * *